United States Patent
Edge et al.

(10) Patent No.: US 8,254,877 B2
(45) Date of Patent: Aug. 28, 2012

(54) METHOD AND APPARATUS FOR EXTENDED CALL ESTABLISHMENT FOR IMS EMERGENCY CALLS

(75) Inventors: Stephen W. Edge, Escondido, CA (US); Arungundram C. Mahendran, San Diego, CA (US); Haipeng Jin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 680 days.

(21) Appl. No.: 12/346,586

(22) Filed: Dec. 30, 2008

(65) Prior Publication Data

US 2009/0191841 A1 Jul. 30, 2009

Related U.S. Application Data

(60) Provisional application No. 61/019,164, filed on Jan. 4, 2008, provisional application No. 61/019,158, filed on Jan. 4, 2008.

(51) Int. Cl.
*H04M 11/04* (2006.01)
(52) U.S. Cl. ........... 455/404.2; 455/445; 455/421
(58) Field of Classification Search ............ 455/421, 455/404.1, 404.2, 445–449
See application file for complete search history.

(56) References Cited

U.S. PATENT DOCUMENTS

| | | | | |
|---|---|---|---|---|
| 7,031,714 | B1 * | 4/2006 | Rayburn | 455/445 |
| 2007/0153986 | A1 * | 7/2007 | Bloebaum et al. | 379/45 |
| 2007/0167146 | A1 * | 7/2007 | Bandaru | 455/404.1 |
| 2007/0254625 | A1 | 11/2007 | Edge | |
| 2009/0154452 | A1 * | 6/2009 | Ku et al. | 370/389 |
| 2011/0096769 | A1 * | 4/2011 | Sim | 370/352 |

FOREIGN PATENT DOCUMENTS

WO    WO2007072462    6/2007

OTHER PUBLICATIONS

3GPP: "3GPP TS 23.167 V7.0.0 (Mar. 2006)—3rd Generation Partnership Project; Technical Specification Group Services and System Aspects; IP Multimedia Subsystem (IMS) emergency sessions (Release 7)" XP007903327, abstract, p. 14, paragraph 7—p. 19.
International Search Report and Written Opinion—PCT/US2009/030010, International Searching Authority—European Patent Office, Apr. 23, 2009.

\* cited by examiner

*Primary Examiner* — Vladimir Magloire
(74) *Attorney, Agent, or Firm* — Darren M. Simon

(57) ABSTRACT

Apparatus and methods of establishing an emergency voice call include user equipment transmitting, and a first serving core network receiving, a request for an emergency call via a wireless access network. The apparatus and methods further include a determination by the first serving core network of an alternative serving core network. In some aspects, the determination may be made based on a user equipment location from a location retrieval function, which may obtain such information from other network components or from the user equipment. In other aspects, the determination may be based on lack of capability or lack of capacity. Further, the apparatus and methods also include establishment of the emergency call with a second serving core network different from the serving core network based on the determination.

108 Claims, 9 Drawing Sheets

METHOD AND APPARATUS FOR EXTENDED CALL ESTABLISHMENT FOR IMS EMERGENCY CALLS

CLAIM OF PRIORITY UNDER 35 U.S.C. §119

The present application for patent claims priority to Provisional Application No. 61/019,164 entitled "METHOD AND APPARATUS FOR EXTENDED CALL ESTABLISHMENT AND SUPPORT FOR IMS EMERGENCY CALLS" filed Jan. 4, 2008, and to Provisional Application No. 61/019,158 entitled "METHOD AND APPARATUS FOR EXTENDED LOCATION SUPPORT FOR IMS EMERGENCY CALLS" filed Jan. 4, 2008, each assigned to the assignee hereof and each hereby expressly incorporated by reference herein.

BACKGROUND

1. Field

The present disclosure relates generally to communication, and more specifically to techniques for originating a call in a communication network.

2. Background

Wireless communication networks are widely deployed to provide various communication services such as voice, video, packet data, messaging, broadcast, etc. These wireless networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

Services provided by wireless communication networks can include the ability to make and receive calls including voice calls and emergency voice calls and the ability to send and receive data including data transmitted using the Internet Protocol (IP). To make and receive voice calls with efficient usage of network resources (e.g. wireless spectrum and wireline signaling and transmission lines), networks and terminals may support Voice over IP (VoIP) for normal calls and for emergency calls. In the case of emergency VoIP calls, networks that support radio access according to 3GPP and 3GPP2 standards (which includes networks that employ GSM, WCDMA, cdma2000 EvDO and LTE) may employ a solution in which support is provided using the IP Multimedia Subsystem (IMS) according to 3GPP Technical Specification (TS) 23.167 for Release 8 which is a publicly available document. When this solution is used, the VoIP emergency call is sometimes referred to as an IMS Emergency Call as call control and call signaling is supported by the IMS in the network (also known as the visited network) that is serving the user's terminal. In this context, a terminal may also be known as a mobile station or user equipment (UE).

A user equipment may be invoked by a user to place a VoIP emergency call with a wireless network, which may or may not be a home network with which the user has service subscription. The UE may go through several phases, such as registration and call establishment, in order to originate the VoIP emergency call. The UE may register with the wireless network so that the UE can be authenticated to the wireless network and the wireless network can obtain pertinent information such as verified identification information and a verified call back number. The UE may then perform call establishment in order to connect the call to an appropriate entity, e.g., a Public Safety Answering Point (PSAP), which can service the emergency call.

If a subscriber does not have wireless access at the time an emergency call is dialed (e.g. the user has just powered on the phone before dialing) or if the user has access to a data only network without voice call capability (e.g. has internet access via a WLAN) then the user's expectation of an emergency call succeeding and the legal requirements for some Voice Service Provider (VSP) supporting the emergency call may both be significantly lower than if the user is already accessing a voice capable network (e.g. a 3GPP voice capable Visited Public Land Mobile Network (VPLMN)) at the time the emergency call is dialed.

One problem is that in many cases, the VSP accessed by the user will not be local to the user's current location. For example, the user may be in a roaming situation and accessing a Home Public Land Mobile Network (H-PLMN) or some other remote VSP using direct IP access (e.g. from a WLAN or some other data only access network). In that case, the VSP may not be able to establish an emergency call to a suitable local PSAP (i.e. a PSAP local to the user) and there may be no local VSP (e.g. 3GPP VPLMN) already being accessed by the user to fall back to.

The serving VSP may then reject an attempt to establish an IMS emergency call (e.g., according to the 3GPP solution in TS 23.167, by returning a SIP 380 alternative service response to the UE) leaving the UE to search around for some alternative—e.g. via scanning for VSPs accessible from its current Internet Protocol Connectivity Access Network (IP-CAN) or by performing a radio search for other wireless IP-CANs. But that is hardly a reliable solution.

Additionally, the current solution for IMS Emergency calls in 3GPP Technical Specification (TS) 23.167 explicitly references and allows use of a 3GPP Control plane location solution and an Open Mobile Alliance (OMA) Secure User Plane Location (SUPL), but other possible location solutions are not explicitly supported.

Therefore, improved apparatus and methods for extended call establishment and location support for an IMS emergency call are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method operable on user equipment for making an emergency voice call comprises transmitting a request for an emergency call to a first serving core network via a wireless access network. The method further comprises establishing the emergency call with a second serving core network different from the first serving core network, wherein the establishing is based on the first serving core network determining an alternative serving core network.

In another aspect, at least one processor operable on user equipment and configured to make an emergency voice call comprises a first module for transmitting a request for an emergency call to a first serving core network via a wireless access network. And, the at least one processor further comprises a second module for establishing the emergency call with a second serving core network different from the first serving core network, wherein the establishing is based on the first serving core network determining an alternative serving core network.

In a further aspect, a computer program product stored in memory, operable on user equipment and configured to make an emergency voice call, comprises a computer-readable medium having a plurality of codes. The codes comprises a first set of codes for causing a computer to transmit a request for an emergency call to a first serving core network via a wireless access network. And, the codes comprise a second set of codes for causing the computer to establish the emergency call with a second serving core network different from the first serving core network, wherein the establishing is based on the first serving core network determining an alternative serving core network.

In still another aspect, an apparatus for making an emergency voice call comprises means for transmitting a request for an emergency call to a first serving core network via a wireless access network. And, the apparatus comprises means for establishing the emergency call with a second serving core network different from the first serving core network, wherein the establishing is based on the first serving core network determining an alternative serving core network.

In an aspect, an apparatus for user equipment (UE) for making an emergency voice call comprises at least one processor configured to transmit a request for an emergency call to a first serving core network via a wireless access network, and to establish the emergency call with a second serving core network different from the first serving core network, wherein the establishing is based on the first serving core network determining an alternative serving core network.

In another aspect, a method operable on network entity for establishing an emergency voice call comprises receiving, at a first serving core network, a request for an emergency call from a user equipment via a wireless access network. The method further comprises determining, by the first serving core network, an alternate serving core network. Additionally, the method comprises initiating, by the first serving core network and based on the determining, establishment of the emergency call with a second serving core network different from the serving core network.

In a further aspect, an apparatus for a network entity for establishing an emergency voice call comprises at least one processor configured to receive, at a first serving core network, a request for an emergency call from a user equipment via a wireless access network, to determine an alternative serving core network, and to initiate, based on the determining, establishment of the emergency call with a second serving core network different from the first serving core network.

In still another aspect, at least one processor operable on a network entity and configured to establish an emergency voice call comprises a first module for receiving, at a first serving core network, a request for an emergency call from a user equipment via a wireless access network. Also, the at least one processor comprises a second module for determining, at the first serving core network, an alternative serving core network. Additionally, the at least one processor further comprises a third module for initiating, at the first serving core network and based on the determining, establishment of the emergency call with a second serving core network different from the first serving core network.

In another aspect, a computer program product stored in memory, operable on a network entity and configured to establish an emergency voice call comprises a computer-readable medium having a plurality of codes. The codes comprise a first set of codes operable to cause a computer to receive, at a first serving core network, a request for an emergency call from a user equipment via a wireless access network. Also, the codes comprise a second set of codes operable to cause the computer to determine, at the first serving core network, an alternative serving core network. Additionally, the codes comprise a third set of codes operable to cause the computer to initiate, at the first serving core network and based on the determining, establishment of the emergency call with a second serving core network different from the first serving core network.

In a further aspect, an apparatus for establishing an emergency voice call comprises means for receiving, at a first serving core network, a request for an emergency call from a user equipment via a wireless access network, and means for determining, at the first serving core network, an alternative serving core network. Additionally, the apparatus comprises means for initiating, at the first serving core network and based on the determining, establishment of the emergency call with a second serving core network different from the serving core network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

For the purposes of the present document, the abbreviations given in 3GPP Technical Specification 21.905 (TR 21.905), 3GPP Technical Specification 23.167 (TS 23.167) and the following apply. An abbreviation defined in the present document takes precedence over the definition of the same abbreviation, if any, in TR 21.905 or TS 23.167.

| <ACRONYM> | <Explanation> |
|---|---|
| CP | Control Plane |
| E-SLP | Emergency SLP |
| FQDN | Fully Qualified Domain Name |
| SLP | SUPL Location Platform |
| SUPL | Secure User Plane Location |
| UP | User Plane |
| V-SLP | Visited SLP |
| VSP | Voice Service Provider |

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
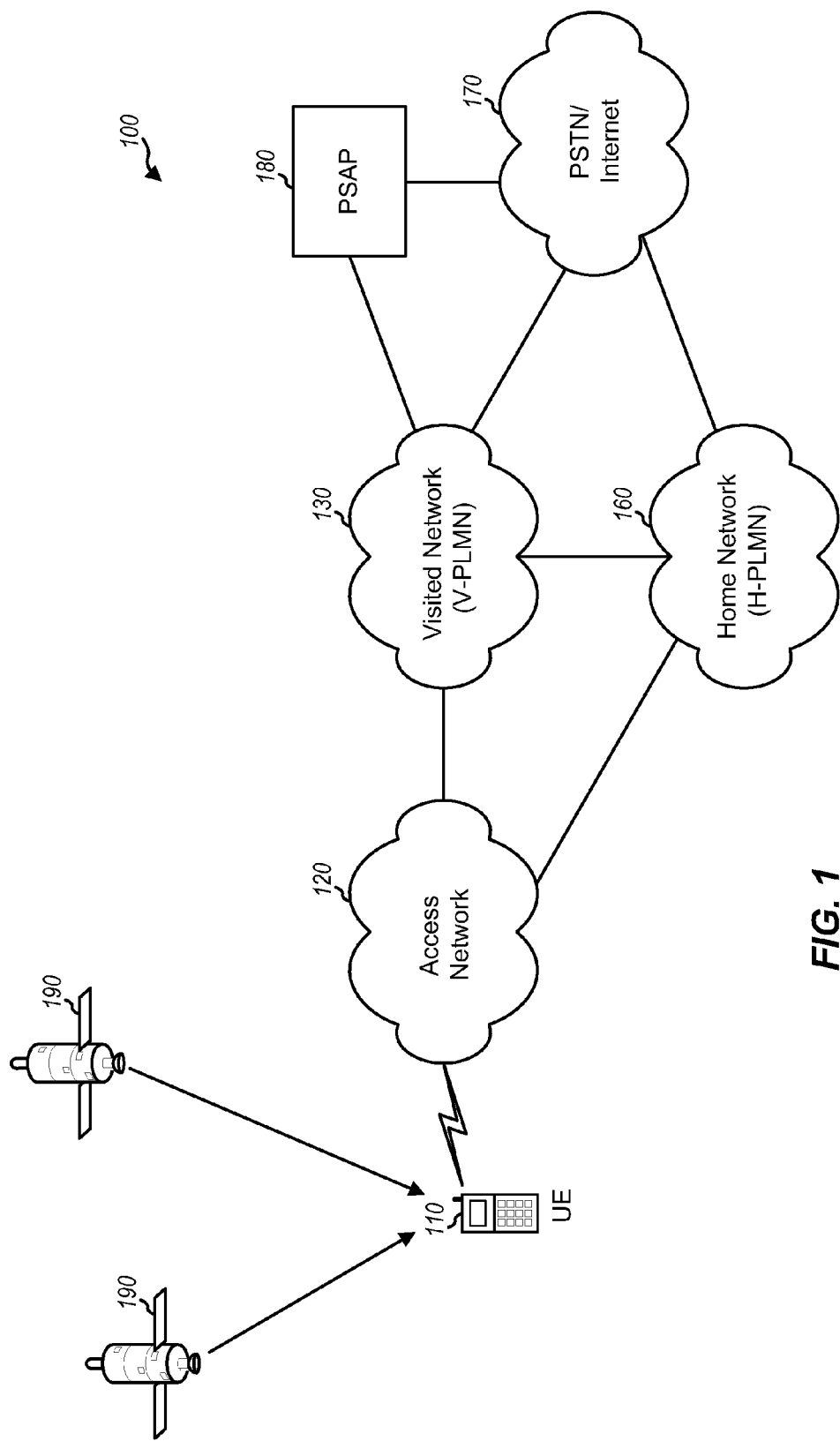
FIG. 1 is a schematic diagram of one aspect of a network deployment.

FIG. 1 shows an example network deployment 100. A UE 110 may communicate with an access network 120 to obtain communication services. UE 110 may be stationary or mobile and may also be referred to as a mobile station, a terminal, a subscriber unit, a station, etc. UE 110 may be a cellular phone, a personal digital assistant (PDA), a wireless device, a wireless modem, a laptop computer, a telemetry device, a tracking device, etc. UE 110 may communicate with one or more base stations and/or one or more access points in access network 120. UE 110 may also receive signals from one or more satellites 190, which may be part of the United States Global Positioning System (GPS), the European Galileo system, the Russian GLONASS system, etc. UE 110 may measure signals from base stations in access network 120 and obtain timing measurements for the base stations. UE 110 may also measure signals from satellites 190 and obtain pseudo-range measurements for the satellites. The pseudo-range measurements and/or timing measurements may be used to derive a position estimate for UE 110. A position estimate is also referred to as a location estimate, a position fix, etc.

Access network 120 provides radio communication for UEs located within its coverage area. Access network 120 may also be referred to as a radio network, a radio access network, etc. Access network 120 may include base stations, access points, network controllers, and/or other entities, as described below. A visited network 130, which may also be referred to as a Visited Public Land Mobile Network (V-PLMN), is a network currently serving UE 110. A home network 160, which may also be referred to as a Home PLMN (H-PLMN), is a network with which UE 110 has subscription. Access network 120 may be associated with visited network 130. Visited network 130 and home network 160 may be the same or different networks and may each comprise various entities that provide data and/or voice connectivity, location services, and/or other functionalities and services.

A network 170 may include a Public Switched Telephone Network (PSTN), the Internet, and/or other voice and data networks. A PSTN supports communication for conventional plain old telephone service (POTS).

A PSAP 180 is an entity responsible for answering emergency calls, e.g., for police, fire, and medical services. An emergency call may be initiated when a user dials a fixed well-known number such as 911 in North America or 112 in Europe. PSAP 180 may also be referred to as an Emergency Center (EC).

The techniques described herein may be used for calls originated in wireline networks such as DSL and cable and for calls originated in wireless wide area networks (WWANs), wireless local area networks (WLANs), wireless metropolitan area networks (WMANs), and wireless networks with WWAN and WLAN coverage. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM), Digital Advanced Mobile Phone System (D-AMPS), etc. UTRA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. A WLAN may implement a radio technology such as IEEE 802.11, Hiperlan, etc. A WMAN may implement a radio technology such as IEEE 802.16. These various radio technologies and standards are known in the art.

Figure 2:
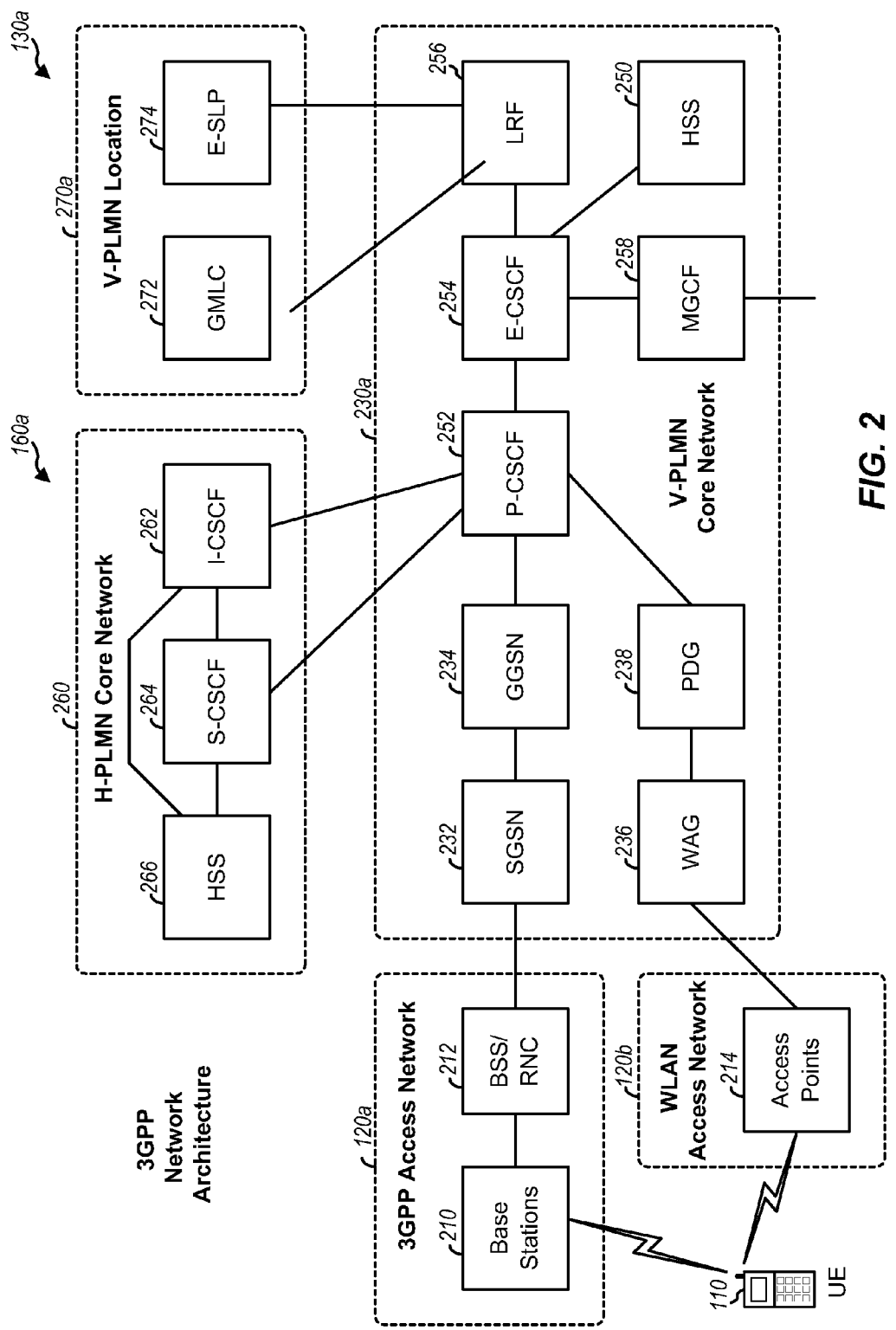
FIG. 2 is a schematic diagram of one aspect of a 3GPP network architecture.

FIG. 2 shows a 3GPP network architecture. UE 110 may gain radio access via a 3GPP access network 120a or a WLAN access network 120b. 3GPP access network 120a may be a GSM EDGE Radio Access Network (GERAN), a Universal Terrestrial Radio Access Network (UTRAN), an Evolved UTRAN (E-UTRAN), etc. 3GPP access network 120a includes base stations 210, a Base Station Subsystem (BSS)/Radio Network Controller (RNC) 212, and other entities not shown in FIG. 2. A base station may also be referred to as a Node B, an evolved Node B (e-Node B), a base transceiver station (BTS), an access point, etc. WLAN 120b includes access points 214 and may be any WLAN.

A V-PLMN 130a is one example of visited network 130 in FIG. 1 and includes a V-PLMN core network 230a and V-PLMN location entities 270a. V-PLMN core network 230a includes a Serving GPRS Support Node (SGSN) 232, a Gateway GPRS Support Node (GGSN) 234, a WLAN Access Gateway (WAG) 236, and a Packet Data Gateway (PDG) 238. SGSN 232 and GGSN 234 are part of a General Packet Radio Service (GPRS) core network and provide packet-switched services for UEs communicating with 3GPP access network 120a. WAG 236 and PDG 238 are part of a 3GPP Interworking WLAN (I-WLAN) core network and provide packet-switched services for UEs communicating with WLAN 120b.

V-PLMN core network 230a also includes IP Multimedia Subsystem (IMS) entities such as a Proxy Call Session Control Function (P-CSCF) 252, an Emergency CSCF (E-CSCF) 254, and a Media Gateway Control Function (MGCF) 258, which are part of a V-PLMN IMS network. P-CSCF 252, E-CSCF 254 and MGCF 258 support IMS services, e.g., Voice-over-Internet Protocol (VoIP). P-CSCF 252 accepts requests from UEs and services these requests internally or forwards the requests to other entities, possibly after translation. E-CSCF 254 performs session control services for the UEs and maintains session state used to support IMS emergency services. E-CSCF 254 further supports emergency VoIP calls. MGCF 258 directs signaling conversion between SIP/IP and PSTN (e.g., SS7 ISUP) and is used whenever a VoIP call from one user goes to a PSTN user.

V-PLMN core network 230a further includes a Location and Routing Function (LRF) 256 and a Home Subscriber Server (HSS) 250. LRF 256 handles retrieval of routing and location information for UEs, including interim, initial, and updated location information. Interim location is an approximate location used for routing a call. Initial location is a first accurate location for a UE, and updated location is a first or subsequent accurate location for the UE. LRF 256 may interact with a separate location server or may have an integrated location server in order to obtain location information for UEs. HSS 250 stores subscription-related information for UEs for which V-PLMN 130a is the home network.

V-PLMN location entities 270a may include a Gateway Mobile Location Center (GMLC) 272, an Emergency Services SUPL Location Platform (E-SLP) 274, and/or other entities that can provide location services for UEs in communication with V-PLMN 130a. GMLC 272 may be part of 3GPP control plane location system. E-SLP 274 supports Secure User Plane Location (SUPL) from Open Mobile Alliance (OMA). An H-PLMN 160a is one example of home network 160 in FIG. 1 and includes an H-PLMN core network 260. H-PLMN core network 260 includes an HSS 266 and IMS entities such as an Interrogating CSCF (I-CSCF) 262 and a Serving CSCF (S-CSCF) 264. I-CSCF 262 and S-CSCF 264 are part of an H-PLMN IMS network and support IMS for home network 160.

FIG. 2 shows one grouping of network elements belonging to V-PLMN 130a and H-PLMN 160a. In this case, the grouping is into two distinct subsystems—an access network (e.g. access network 120a) and a core network (e.g. core network 230a and core network 260). However, network elements belonging to a PLMN may be grouped into other subsystems as well. For example, network elements may be identified belonging to an IP Connectivity Access Network (IP-CAN) that supports IP access for user terminals according to a particular IP access technology. For example, base stations 210, BSS/RNC 212, SGSN 232 and GGSN 234 comprise an IP-CAN for the V-PLMN 130a in FIG. 2 that supports IP access using GPRS. WLAN Access Points 120b, WAG 236 and PDG 238 comprise another IP-CAN for V-PLMN 130a in FIG. 2 that supports IP access from a WLAN. Further IP-CANs are also possible—e.g. an IP-CAN employing direct IP access via the Internet from WLAN Access Points 214. Another grouping of network elements is the collection of elements that support IMS functions. Commonly known as the IMS Core, this grouping includes P-CSCF 252, E-CSCF 256, MGCF 258 and LRF 256 for V-PLMN 130a in FIG. 2. Further elements not shown in FIG. 2 may also be included in the IMS Core and IP-CAN subsystems. Furthermore, the IMS Core subsystem for any network will normally be a subset of the Core network subsystem. In the description below, actions attributed to a particular IMS Core may thus also apply to the associated Core Network while actions associated with SIP and IMS that are attributed to a particular Core network will commonly apply to the IMS Core subsystem that this contains. Hence the terms Core Network, IMS Core Network and IMS Core are used interchangeably below regarding actions that apply to all of them.

Figure 3:
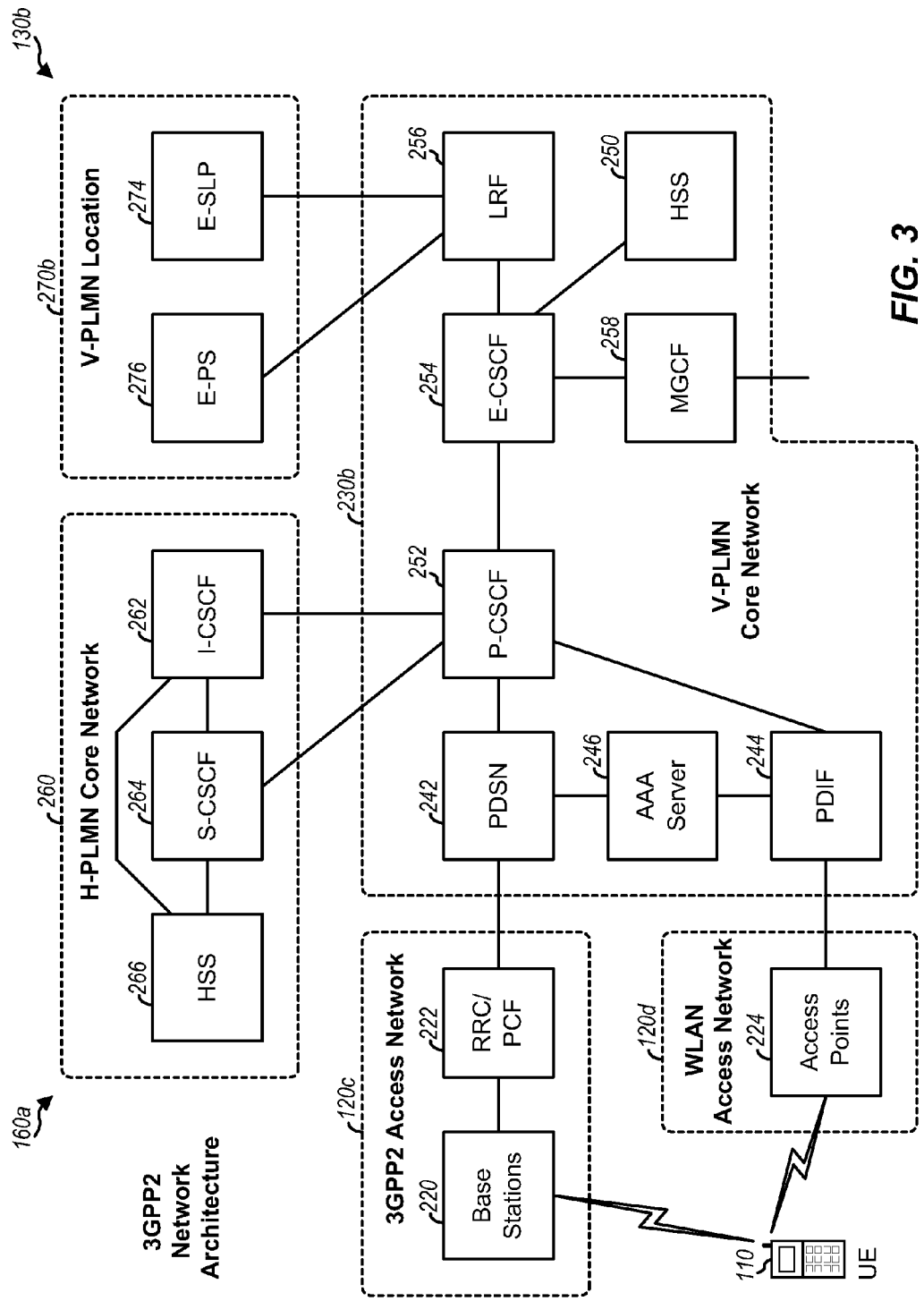
FIG. 3 is a schematic diagram of one aspect of a 3GPP2 network architecture.

FIG. 3 shows a 3GPP2 network architecture. UE 110 may gain radio access via a 3GPP2 access network 120c or a WLAN access network 120d. 3GPP2 access network 120c may be a CDMA2000 1X network, a CDMA2000 1xEV-DO network, etc. 3GPP2 access network 120c includes base stations 220, a Radio Resource Control/Packet Control Function (RRC/PCF) 222, and other entities not shown in FIG. 3. RRC may also be called a Radio Network Controller (RNC). WLAN 120d includes access points 224 and may be any WLAN associated with a 3GPP2 network.

A V-PLMN 130b is another example of visited network 130 in FIG. 1 and includes a V-PLMN core network 230b and 3GPP2 location entities 270b. V-PLMN core network 230b includes a Packet Data Serving Node (PDSN) 242, a Packet Data Interworking Function (PDIF) 244, and an Authentication, Authorization and Accounting (AAA) server 246. PDSN 242 and PDIF 244 provide packet-switched services for UEs communicating with 3GPP2 access network 120c and WLAN 120d, respectively. V-PLMN core network 230a also includes IMS or Multimedia Domain (MMD) entities such as P-CSCF 252, E-CSCF 254, and MGCF 258. E-CSCF 254 may also have other names such as ES-AM (Emergency Services Application Manager). 3GPP2 location entities 270b may include E-SLP 272, an Emergency Services Position Server (E-PS) 276, and/or other entities that can provide location services for UEs in communication with V-PLMN 130b.

As for a 3GPP network, other groupings of network elements into other subsystems are possible for a 3GPP2 network. For example, for V-PLMN 130b in FIG. 3, an IP-CAN subsystem supporting simple IP access and/or mobile IP access is comprised of Bases Stations 220, RRC/PCF 222, PDSN 242 and AAA server 246. Another IP-CAN subsystem for V-PLMN 130b supporting WLAN access is comprised of WLAN Access Points 224, PDIF 244 and AAA server 246. An IMS Core subsystem for V-PLMN 130b is comprised of P-CSCF 252, E-CSCF 254, MGCF 258 and LRF 256. Other network elements not shown in FIG. 3 may also be included in these different subsystems.

For simplicity, FIGS. 2 and 3 show only some of the entities in 3GPP and 3GPP2, which may be referred to in the description below. 3GPP and 3GPP2 networks may include other entities defined by 3GPP and 3GPP2, respectively.

Apparatus and methods for performing extended call establishment and providing extended location support for IMS emergency calls are described herein. The aspects may be used for various types of calls, such as, but not limited to, voice calls, VoIP calls, emergency calls, emergency VoIP calls, etc. An emergency call is a voice call for emergency services. An emergency VoIP call is an emergency call using VoIP or packet mode. An emergency call may be associated with various characteristics that may be different from an ordinary voice call such as, but not limited to, obtaining a suitable position estimate for a UE, routing the emergency call to an appropriate PSAP, etc. The aspects may be advantageous for a user roaming in a visited network and may mitigate the possibility of a failure to establish the emergency call. Further, the aspects may be advantageous for a user roaming in a visited network in order to extend the current 3GPP and 3GPP2 architectural framework and the associated procedures to allow use of other possible location solutions besides the 3GPP Control plane location solution and OMA SUPL. For example, having an extended 3GPP architectural framework that allows for such solutions would be useful to operators and vendors and would help avoid a situation where a deployed solution did not exactly fit within the 3GPP definition.

For clarity, certain aspects of the techniques are described below for an emergency VoIP call in 3GPP networks. For VoIP, UE 110 typically performs IMS registration with home network 160 via Session Initiation Protocol (SIP) signaling with various IMS entities. SIP is a signaling protocol for initiating, modifying, and terminating IP-based interactive user sessions such as VoIP and is described in RFC 3261, entitled "SIP: Session Initiation Protocol," June 2002, which is publicly available.

Figure 4:
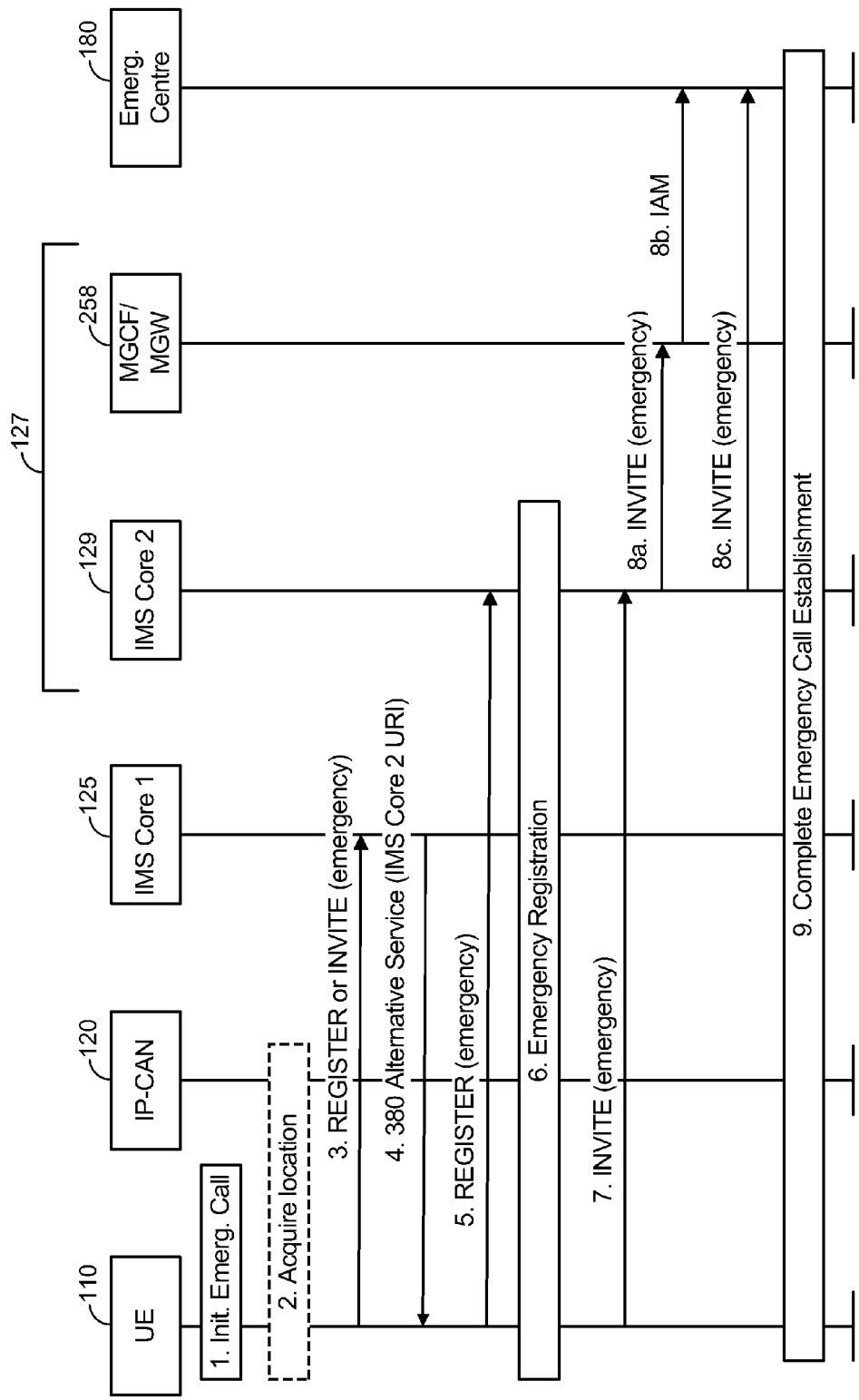
FIG. 4 is a message flow diagram of one aspect of an emergency call origination with subsequent emergency call redirection.

Referring to FIG. 4, in one aspect, disclosed examples provide alternative solutions whereby a serving VSP may direct an IMS emergency call to a more suitable local VSP without requiring the UE to perform a new search for such a VSP which may consume significant time and, in some cases, result in a failed call. In the current 3GPP and 3GPP2 solution, if a serving VSP (e.g. the home VSP) cannot support a VoIP emergency call request from some UE, it may tell the UE to establish the call in some more local VSP. However, the UE is responsible for finding and selecting this VSP which may be difficult if the IP-CAN currently serving the UE is not associated with such a VSP (e.g. is not owned by an operator who provides the 3GPP or 3GPP2 solution for VoIP emergency calls).

In one aspect of one solution to this problem, the original serving VSP employs a SIP 380 response to provide the UE with an identification of an alternative VSP. The identification could be a URI (e.g. the URI of an element in the IMS Core of the VSP) or a Fully Qualified Domain Name (FQDN) or an IP address or a 3GPP or 3GPP2 Mobile Country Code (MCC) plus Mobile Network Code (MNC) or some other designation or address characteristic of the VSP. Furthermore the identification may be immediately usable (e.g. the IP address of some network element in the VSP or, for a 3GPP or 3GPP2 VSP, within the IMS Core of the VSP) or may require translation or lookup in some intermediate entity—e.g. it may be an FQDN that needs to be translated to an IP address using a Domain Name System (DNS) server. Further, this aspect does not require any change to the existing architecture already defined in TS 23.167. In this aspect, the serving VSP and new VSP to which the call is redirected both support this architecture.

Referring to FIG. 4, in one example of a method of establishing an IMS emergency call via call redirection, a sample call flow includes various acts performed by UE 110, a serving core network 125, such as a first V-PLMN 130 or H-PLMN 160 that includes an IMS Core Network 1 and associated components such as P-CSCFs 252, MGCFs 258, LRFs 256, at least one alternative serving core network 127, such as a second V-PLMN 130 that includes an IMS Core Network 2 and associated components such as P-CSCFs 252, MGCFs 258, LRFs 256. At step 1, an emergency call is initiated at user equipment (UE) 110. For example, the user equipment may receive at a user interface an input by a user indicating an emergency call, such as a voice input or a key input representing "911." Further, for example, the emergency call may be initiated through an Internet Protocol Connectivity Access Network (IP-CAN) 120 such as any of those described previously for V-PLMN 130a in FIG. 2 and for V-PLMN 130b in FIG. 3

At step 2, the UE 110 may determine its own location or a location identifier or may obtain location information from the IP-CAN 120. Further, for example, the UE 110 may determine the information from satellite-based systems, such as a GPS system, or from terrestrial-based networks, such a cellular access network 120a or WLAN access network 120b.

At step 3, the UE 110 transmits a request for an emergency call to a serving core network 125—e.g. to an entity in IMS Core Network 1 belonging to core network 125. For example, the request may include a REGISTER message with an emergency indication or an INVITE message with an emergency indication sent to the currently serving IMS core (IMS Core 1) 125, such as an IMS Core belonging to V-PLMN 130 or H-PLMN 160. More specifically, the request may be sent to and received by a P-CSCF 252 of the respective IMS Core. In some aspects, the REGISTER or INVITE message may include any location information in possession of UE 110.

At step 4, the serving core network 125 determines that it cannot support the emergency call and sends an alternative service response to the UE 110. This determination may be based on lack of capability in Core Network 125 (e.g. no support for VoIP Emergency Calls), or lack of resources (e.g. caused by congestion in either Core Network 125 or IP-CAN 120), or determination that the location of UE 110 is outside of an emergency serving area of the serving core network 125 or other factors. For example, in determining that the location of UE 110 is outside of an emergency serving area of the serving core network 125, the serving IMS Core 125 or a component thereof (e.g. the P-CSCF 252 or E-CSCF 254) may communicate with an associated LRF 256, which, in some aspects, is operable to obtain initial or further UE location information from the IP-CAN 120 and/or from the UE 110. The location information may include, but is not limited to, a geographic location, such as latitude and longitude information, or a network-based location, such as an identifier of a network component, e.g. base station, that may be correlated to a geographic location. The serving core network 125, e.g. IMS Core 1, determines from the location information provided in step 3 and/or from the location information obtained via the LRF 256 (from the IP-CAN 120 and/or UE 110) that the UE 110 is located outside the emergency serving area for the serving core network 125. In particular, the serving core network 125 may determine that the UE location is outside of a geographic location serviced by any public safety access point or emergency center 180, both referred to hereinafter as a PSAP, that can be reached by Core Network 125.

Additionally, the serving core network 125 may identify an alternative serving core network 127, e.g. IMS Core 2, which the UE can be referred to in order to initiate the emergency call. In some aspects, the serving core network 125 identifies a type of network for the UE to search for (e.g. a cellular type network, a WLAN-type network) to properly establish the emergency call, while in other aspects the UE identifies a specific network or network component. Specifically, in one aspect, the serving core network 125 may determine and identify one or more alternative serving core networks 127 having an emergency serving area that includes the UE location. Such determination may be based on mapping the UE location, based on the UE location information, to core network identifiers having emergency serving areas coinciding with, or having PSAPs with serving geographic locations that include, the UE location. Such determination may instead be based on mapping information related to the network most immediately serving the UE (e.g. IP-CAN 120 or a component of IP-CAN 120 such as a serving WLAN or serving base station) to one or more alternative serving core networks having emergency serving areas coinciding with, or having PSAPs with serving geographic locations that include, the UE location.

In a specific aspect, the serving IMS Core 125 returns a SIP 380 Alternative Service response that includes the identification (e.g. URI containing an IP address or FQDN) of a P-CSCF in an alternative IMS Core (IMS Core 2)—e.g. in the SIP Contact Address header of the 380 response. The serving IMS Core may include identification (e.g. URIs) for additional IMS Cores. Alternately, when the serving IMS Core 125 redirects the UE 110 to use a different P-CSCF 252, the serving IMS Core 125 may return a different SIP 3xx response (e.g. a 305 response), instead of a 380 Response. In some aspects, the address of the new P-CSCF 252 will be returned in the Contact header of the 3xx (e.g. 305) Response. It should be noted, however, that the alternative service identifier may be placed in other parts of the message.

Further, in an example of identifying a type of network, as an alternative to including the universal resource identifier (URI) of the P-CSCF 252 in the 380 response, the serving IMS Core 125 may include some other identifier (e.g., an access point name (APN) or MCC and MNC) indicating the packet core network to connect to in order to make the emergency call. If the UE 110 receives such an identifier, the UE 110 can connect to the identified packet data network and perform P-CSCF discovery before proceeding with the subsequent acts.

Additionally, the procedures for utilizing LRF 256 to obtain additional location information, as described below with respect to FIG. 7, may also be utilized.

At step 5, the UE 110 may access another IP-CAN not shown in FIG. 4 that is associated with or can access the network or one of the networks identified in step 4 or UE 100 may continue to use IP-CAN 120. UE 110 then transmits another request for an emergency call to the alternative serving core network based on the alternative core network identifier in the alternative service response in step 4. In one aspect, for example, the UE 110 sends a REGISTER message with an emergency indication to the alternative IMS Core, or one of the alternative IMS Cores, indicated in at step 4. In some aspects, the REGISTER message includes any location information in possession of the UE.

At step 6, if the alternative serving core network 127, such as IMS Core 2, or a component thereof (e.g. a P-CSCF 252), determines that the UE 110 is outside its own emergency serving area or that an emergency call cannot be supported for other reasons (e.g. no agreement with the UE's home network, e.g. H-PLMN 160), it may return an alternative service response with one or more alternative service identifiers, such as a 380 Alternative Response carrying one or more URIs for other IMS Cores, as in step 4. In that case, the UE 110 may attempt other requests using other alternative service identifiers, such as in step 5, including those identifiers provided in step 4 or step 6.

Otherwise, the alternative serving core network continues the emergency registration via the UE's home network 160. For example, alternative serving core network 127 or a component thereof (e.g. a P-CSCF 252) continues the emergency registration via the UE's home network 160. In so doing, the identity of the UE 110 can be authenticated and a secure IP connection can be established with the UE 110.

At step 7, the UE 110 sends an INVITE message with an emergency indication to the alternative serving core network 127, such as IMS Core 2, or a component thereof. In some aspects, the INVITE message includes any location information in possession of the UE. In some aspects, the INVITE message may be forwarded within the alternative serving core network 127, e.g. from a P-CSCF 252 to an E-CSCF 254, and additional location information may be obtained (e.g., by an associated LRF 256).

At step 8, the alternative serving core network 127, such as IMS Core 2, selects an emergency centre or PSAP 180 based on location information available at or following step 7.

At step 8a, the INVITE message is sent to an MGCF/MGW 258, and, at step 8b, the INVITE is translated by MGCF 258 into an SS7 ISDN User Part (ISUP) Initial Address Message (IAM) which is transmitted to or towards the emergency centre or PSAP 180 if the latter is not IP capable. Alternatively, at step 8c, the INVITE message is sent directly to the emergency centre or PSAP 180 if the latter is IP capable.

At step 9, the emergency call establishment between the UE 110 and the emergency centre or PSAP 180 servicing the location of the UE 110 is completed.

Figure 5:
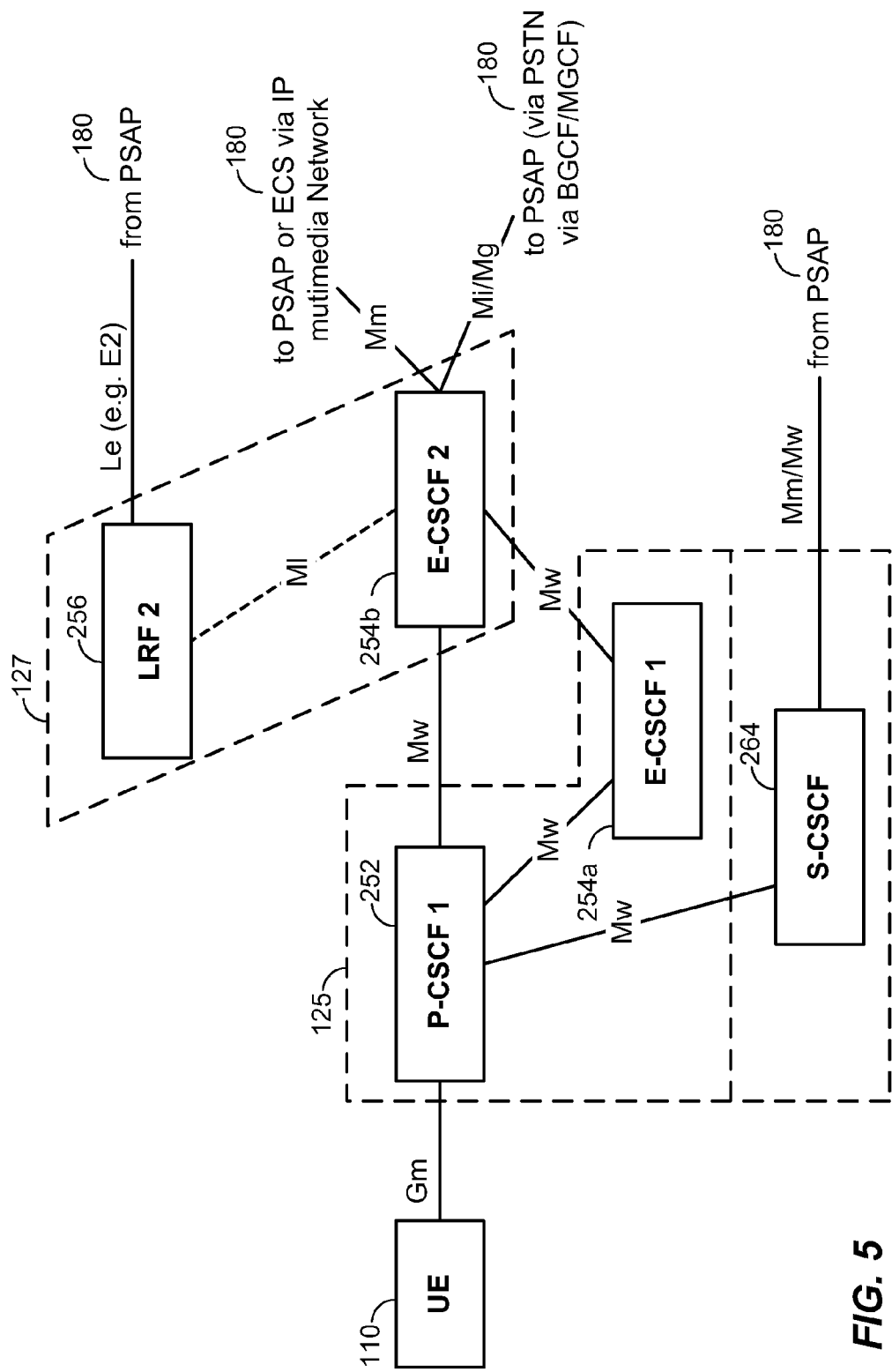
FIG. 5 is a schematic diagram of one aspect of an extended network architecture for forwarding an emergency call from an initial serving IMS core network to an alternative IMS core network.
Figure 6:
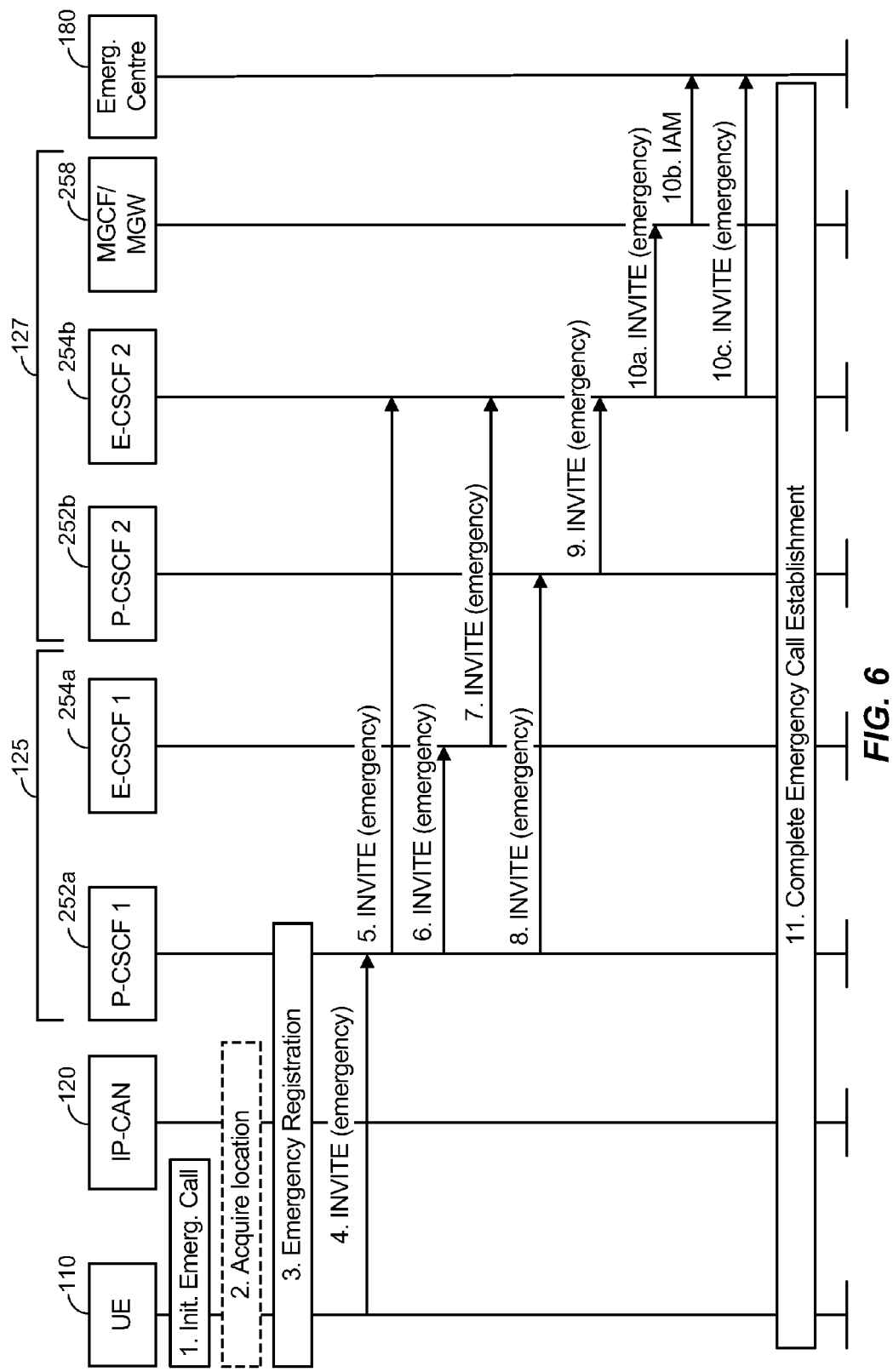
FIG. 6 is a message flow diagram of one aspect of an emergency call origination with subsequent emergency call forwarding.

Referring to FIGS. 5 and 6, in an aspect, IMS Emergency call forwarding is an another extension to the 3GPP and 3GPP2 solution for VoIP emergency calls in Release 8 that has the same objectives and rationale as the extension described above. It may be viewed as an alternative solution for these objectives. Instead of redirecting the call back to the UE, the initial serving IMS Core forwards the call to an alternative IMS Core.

Specifically, referring to FIG. 5, the solution defined here extends the architecture defined in TS 23.167. In particular, P-CSCF 1 (252) and E-CSCF 1 (254a) belong to serving core network 125, referred to as IMS Core Network 1 (e.g. the Home IMS Core Network, e.g. H-PLMN 160, or a currently serving IMS Core Network, e.g. V-PLMN 130) while E-CSCF 2 (254b) and LRF 2 (256) belong to the alternative serving core network 127, referred to as IMS Core Network 2—e.g. one supporting IMS emergency calls at the current location of the UE. The CSCF to CSCF (Mw) interface from P-CSCF 1 to E-CSCF 2 and the Mw interface from E-CSCF 1 to E-CSCF 2 are alternatives—only one of which is needed. Other interfaces from IMS Core 1 to IMS Core 2 are also possible—e.g. P-CSCF 1 or E-CSCF 1 to an I-CSCF in IMS Core 2. The S-CSCF 264 may either belong to IMS Core network 1, e.g. V-PLMN 130 or H-PLMN 160, or to a separate home IMS Core, e.g. H-PLMN 160, if IMS Core Network 1 is not the UE's home network.

Further, referring to FIG. 6, in one example, a message flow for call forwarding of an emergency IMS call involves a number of acts involving the components described above. It should be noted that the steps described below may include corresponding aspects described above with respect to FIG. 4, although the below acts to forward the call rather than provide an alternative service response.

At step 1, the UE 110 initiates an emergency call. For example, the emergency call initiation may be similar to that described above with respect to FIG. 4.

At step 2, the UE 110 may determine its own location or location identifier or may obtain location information from IP-CAN 120. For example, such location information determination may be similar to that described above with respect to FIG. 4.

At step 3, the UE 110 may transmit a request for an emergency call to the serving core network 125. In one aspect, UE 110 initiates an IMS Emergency Registration with the currently serving IMS Core (IMS Core 1) 125 by sending a REGISTER message with an emergency indication to P-CSCF 1 252a. If so, P-CSCF 1 252a continues the emergency registration with the home IMS network 160 as defined in TS 23.167. The IMS Emergency registration may not be needed if IMS Core 1 125 is the home network 160 and the UE 110 is not roaming.

At step 4, the request for the emergency call further includes the UE 110 sending an INVITE message with an emergency indication to P-CSCF 1 252a. In some aspects, the INVITE message may include any location information known by the UE 110.

At step 5, in one aspect, based on a lack of capability to support the emergency call or based on the location information received in step 4, or based on location information received from an associated LRF 256, P-CSCF 1 252a may forward the INVITE to E-CSCF 2 254b in an alternative serving core network 127 (IMS Core 2) that supports IMS emergency calls for the current location of the UE 110. The determination made by serving core network 125 to forward the emergency call may include any of the location determination and alternative core network identification procedures described above in FIG. 4, or described below with respect to FIG. 7. The forwarding may be based on a correspondence between the UE location and an emergency serving area of the alternative serving core network, such as described above with respect to FIG. 4. In this case, steps 6 and 7 are skipped.

At step 6, in another aspect, if step 5 is not used, P-CSCF 1 252a forwards the INVITE message to E-CSCF 1 254a in the same IMS Core network 125. At step 7, E-CSCF 1 254a may verify any location information obtained in step 6 and may obtain additional location information (e.g. from an associated LRF 256; in a similar manner as described above). Based on this location information or on other factors (e.g. lack of resources), E-CSCF 1 254a forwards the INVITE message to E-CSCF 2 254b in alternative serving core network 127 (IMS Core 2) that supports IMS emergency calls for the current location of the UE 110.

In yet another alternative to step 5 or to steps 6 and 7, at step 8, P-CSCF 1 252a forwards the INVITE message to P-CSCF 2 252b in alternative serving core network 127, e.g. IMS Core 2. And, at step 9, P-CSCF 2 252b forwards the INVITE message to E-CSCF 2 254b in alternative serving core network 127 (IMS Core 2) that supports IMS emergency calls for the current location of the UE 110. Other means of forwarding are also possible from other network elements of IMS Core Network 1 to other network elements of IMS Core Network 2.

At step 10a, E-CSCF 2 254b may itself or using an associated LRF 256 verify any location information obtained in the respective one of step 5, step 7 or step 9, obtain additional location information, determine an emergency centre or PSAP 180 based on this location information and determine correlation information (e.g. an emergency service query key (ESQK)).

Further, at step 10a, the INVITE message is sent to an MGCF/MGW 258, and, at step 10b, the IAM is continued towards the emergency centre or PSAP 180. Alternatively, instead of the forwarding at steps 10a and 10b, at step 10c, E-CSCF 2 254b may send the INVITE message directly to the emergency centre or PSAP 180.

At step 11, the emergency call establishment is completed.

As an alternative, if IMS Core Network 2 is unable to support the VoIP emergency call, it may forward the call to a third IMS Core Network by repeating the actions associated with step 5, steps 6 and 7, or steps 8 and 9. The third IMS Core Network may further forward the call or may establish the call to an emergency center by performing steps similar to either steps 10a and 10b or step 10c. In another alternative, the procedure exemplified in FIG. 4 may be combined with the procedure exemplified in FIG. 6. For example, a VoIP emergency call may be redirected from some Core Network 1 to another more suitable Core Network 2 using the procedure exemplified in FIG. 4 and then forwarded by Core network 2 to a third Core Network 3 using the procedure exemplified in FIG. 6. Alternatively, a VoIP emergency call may be forwarded by some Core Network 1 to another more suitable Core Network 2 using the procedure exemplified in FIG. 6 and then redirected by Core network 2 to a third Core Network 3 using the procedure exemplified in FIG. 4. Other combinations of these procedures may also be possible.

The procedure described above is transparent to the UE and to the PSAP, and can be transparent to IMS Core 2 provided IMS Core 2 (e.g. E-CSCF 2 or P-CSCF 2) is configured to receive IMS emergency calls from IMS Core 1 (e.g. by maintaining secure IP connections between the communicating entities at all times or by allowing such secure connections to be established as needed dynamically). Impacts to IMS Core 1 may be restricted to just the P-CSCF or to just the E-CSCF depending on whether the P-CSCF or the E-CSCF forwards the call to IMS Core 2. As the UE will only be registered via IMS Core 1, a trust relationship should exist between IMS Core 1 and IMS core 2 such that IMS Core 2 can assume that any UE identity and call back URI provided by IMS Core 1 is already authenticated. The impacts can be backward compatible with the current 3GPP and 3GPP2 solution for IMS Emergency Calls in 3GPP Release 8 since only IMS Core Network 1 is impacted.

Besides enabling support of IMS emergency calls outside the normal coverage area of a network (e.g. IMS Core 1 in FIG. 6), the procedure also enables an IMS Core Network to support IMS Emergency Calls for its users when it does not possess all the necessary entities (e.g. if there is no E-CSCF and LRF)—by forwarding all IMS Emergency calls from the P-CSCF to one E-CSCF or to several alternative E-CSCFs or to other IMS entities in other networks.

Figure 7:
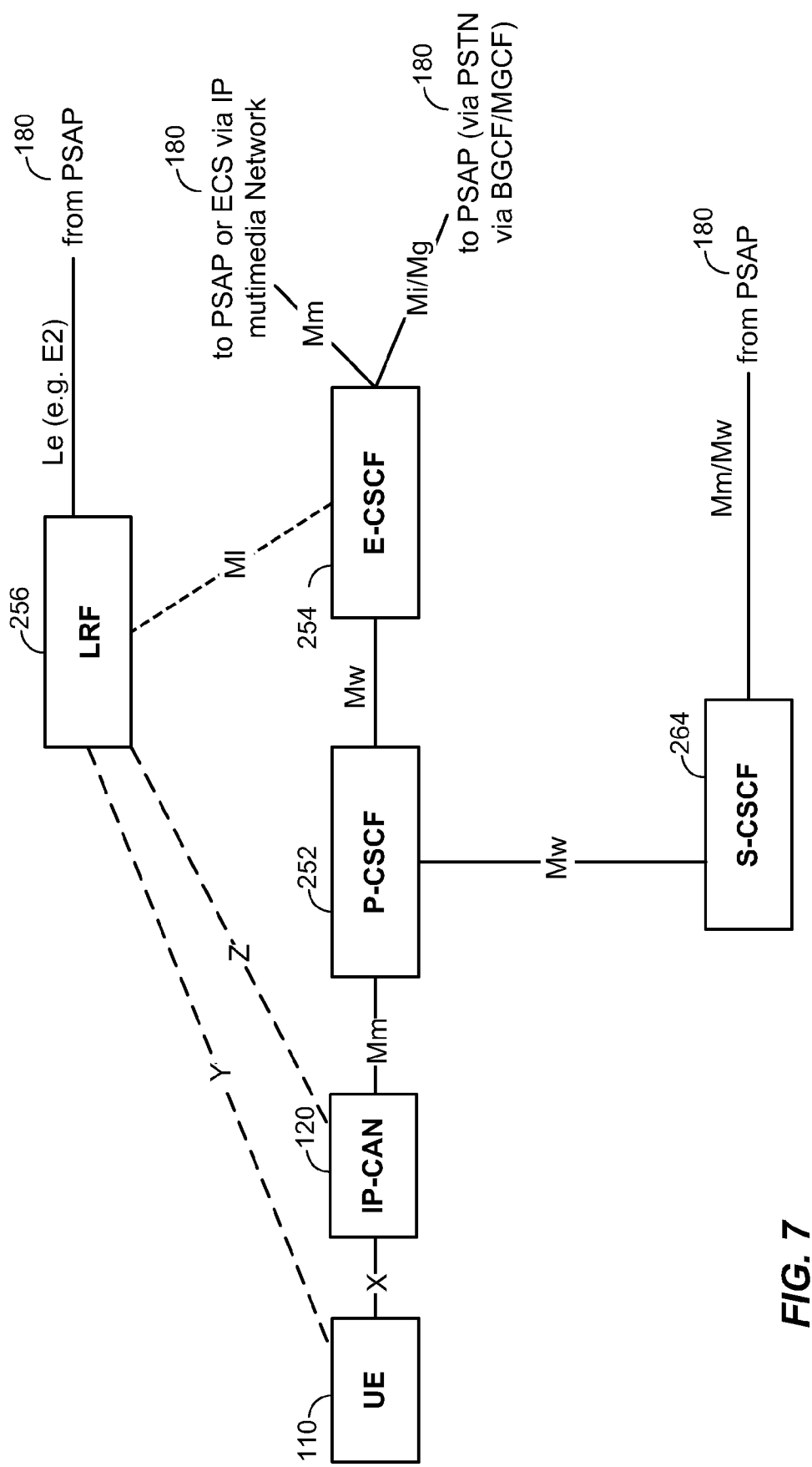
FIG. 7 is a schematic diagram of one aspect of an extended network architecture for forwarding or redirecting an emergency call from an initial serving IMS core network to an alternative IMS core network.

Referring to FIG. 7, in another aspect, the LRF 256 may support one or more location solutions that enable location information to be obtained from the IP-CAN 120 using interface Z and/or from the UE 110 using interface Y. In addition or as an alternative, the UE 110 may obtain location information from the IP-CAN 120 using interface X and transfer this to the LRF 256 via the P-CSCF 252 and E-CSCF 254. Examples of protocols already defined that support interfaces X, Y and Z in the figure are the IETF HELD protocol in the case of X, OMA RLP in the case of Z and OMA ULP in the case of Y.

Figure 8:
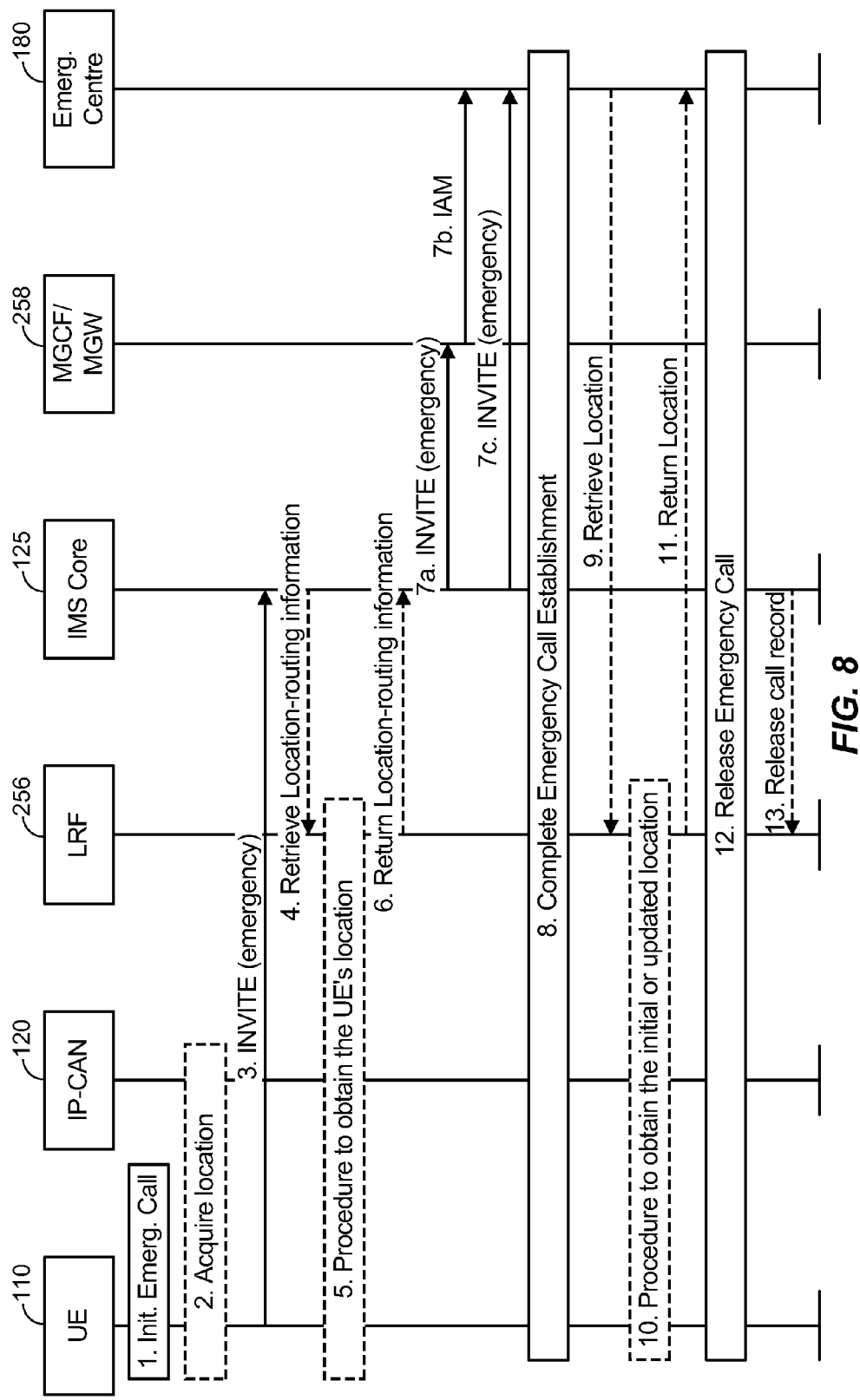
FIG. 8 is a message flow diagram of one aspect of an emergency call origination with subsequent emergency call forwarding or emergency call redirection.

In another aspect, referring to FIG. 8, a method of extended location support for IMS emergency calls includes a number of acts performed by the components described above. It should be noted that the steps described below may include corresponding aspects described above with respect to FIGS. 4 and 6.

At step 1, the UE 110 initiates an emergency call.

At step 2, the UE 110 may determine its own location or location identifier. If the UE is not able to determine its own location, the UE may, if capable, request its location information from the IP-CAN 120, if that is supported for the used IP-CAN 120. If applicable, the IP-CAN 120 delivers to the UE 110 the UE's geographical location information and/or the location identifier.

At step 3, the UE 110 sends an INVITE message with an emergency indication to the serving core network 125, e.g. an IMS core. In some aspects, the INVITE message may include any location information known by the UE 110. The location information may be geographical location information or a location identifier, which is dependant upon the access network technology. In case the UE 110 is not able to provide any location information, the IMS core 125 may seek to determine the UE's location from the LRF 256 as described below. The INVITE message may optionally contain information concerning the location solutions and position methods supported by the UE 110.

At step 4, if the location information provided in step 3 is trusted and sufficient to determine the correct PSAP 180, the procedure continues from step 7 onwards. Alternatively, if the location information is insufficient or if the IMS core 125 requires emergency routing information, or if the IMS core 125 is required to validate the location information, or if the IMS core 125 is required to map the location identifier received from the UE 110 into the corresponding geographical location information, then the IMS core 125 sends a location request to the LRF 256. The request shall include information identifying the IP-CAN 120 and the UE 110 and may include a mechanism to access the UE 110, such as but not limited to the UE's IP address. In some aspects, the request may also include any location information provided by the UE 110 in step 2. Optionally, the request may include any information concerning the location solutions and position methods supported by the UE 110.

At step 5, the LRF 256 may already have the information requested by IMS core 125 or LRF 256 may request the UE's location information. The mechanism to obtain the location information of the UE 110 may differ depending on the access technology the UE 110 is using to access the IMS core network 125. In general, the LRF 256 may interact with the IP-CAN 120 and/or the UE 110 to obtain location information. In the case of interaction with IP-CAN 120, the LRF 256 may communicate with a location server (e.g. a gateway mobile location center (GMLC), an Open Mobile Alliance (OMA) Secure User Plane for Location (SUPL) or SULP Location Platform (SLP) or some other server) in the IP-CAN 120, or may communicate with an entity supporting UE IP connectivity (e.g. an SGSN 232). This interaction may or may not be defined by 3GPP. One example of a non-3GPP solution is OMA SUPL defined in OMA AD SUPL: "Secure User Plane Location Architecture," OMA TS ULP: "User Plane Location Protocol," hereby incorporated by reference herein. This solution may be used if supported by UE 110 and if it is possible to establish a user plane connection between the UE and the SUPL server. Information provided in step 4 concerning the location solutions and position methods supported by the UE 110 may optionally be used by the LRF 256 to help determine the mechanism to obtain the location information. Further, the LRF 256 may invoke a Routing Determination Function (RDF) to convert the location information received in step 4 or obtained in step 5 into PSAP routing information. In some aspects, the LRF 256 may store the location information, but only for a defined limited time in certain regions, according to regional requirements.

At step 6, the LRF 256 sends the location information and/or the routing information to the IMS core 125. The LRF 256 may also return correlation information (e.g. ESQK) identifying itself and any record stored in step 5.

At step 7, the IMS core 125 uses the routing information provided in step 6 or selects an emergency centre or PSAP 180 based on location information provided in step 3 or 6, and sends the request including the location information and any correlation information and, in some aspects, location information source, e.g., positioning method that was used to obtain the location information, to the emergency centre or PSAP 180.

At step 7a, the INVITE message is sent to an MGCF/MGW 258.

At step 7b, the IAM is continued towards the emergency centre or PSAP 180, or, at step 7c, the INVITE message is sent directly to the emergency centre or PSAP 180.

In any case, at step 8, the emergency call establishment is completed.

At step 9, the PSAP 180 may send a location request to the LRF 256 to get the initial location information for the target UE 110, or to request LRF 256 to get updated, e.g. current, location information for the target UE 110. The PSAP 180 may determine the LRF 256 based on the location and/or correlation information received in step 7. The PSAP 180 may also include the correlation information in the request to the LRF 256.

At step 10, the LRF 256 determines the location of the target UE 110 using one of the mechanisms from step 5 above. In some aspects, the LRF 256 may use the correlation information received in step 9 to retrieve information about the UE 110 that was stored in step 5.

At step 11, the LRF 256 returns the initial or updated location information to the emergency centre or PSAP 180. As an option for initial location, the LRF 256 may instigate the location step 10 before the request in step 9 is received, and may send the initial location to the emergency centre or PSAP 180 either after the request in step 9 is received or before it is received.

At step 12, the emergency call is released.

At step 13, the IMS core 125 may indicate to the LRF 256 that the emergency call is released. Accordingly, in some aspects, the LRF 256 may delete any record stored in step 5.

The above disclosed examples allow vendors and operators the possibility of supporting new location solutions in the future without the need to revisit the basic solution for IMS emergency calls. This is achieved by an explicit broadening of the solution.

Figure 9:
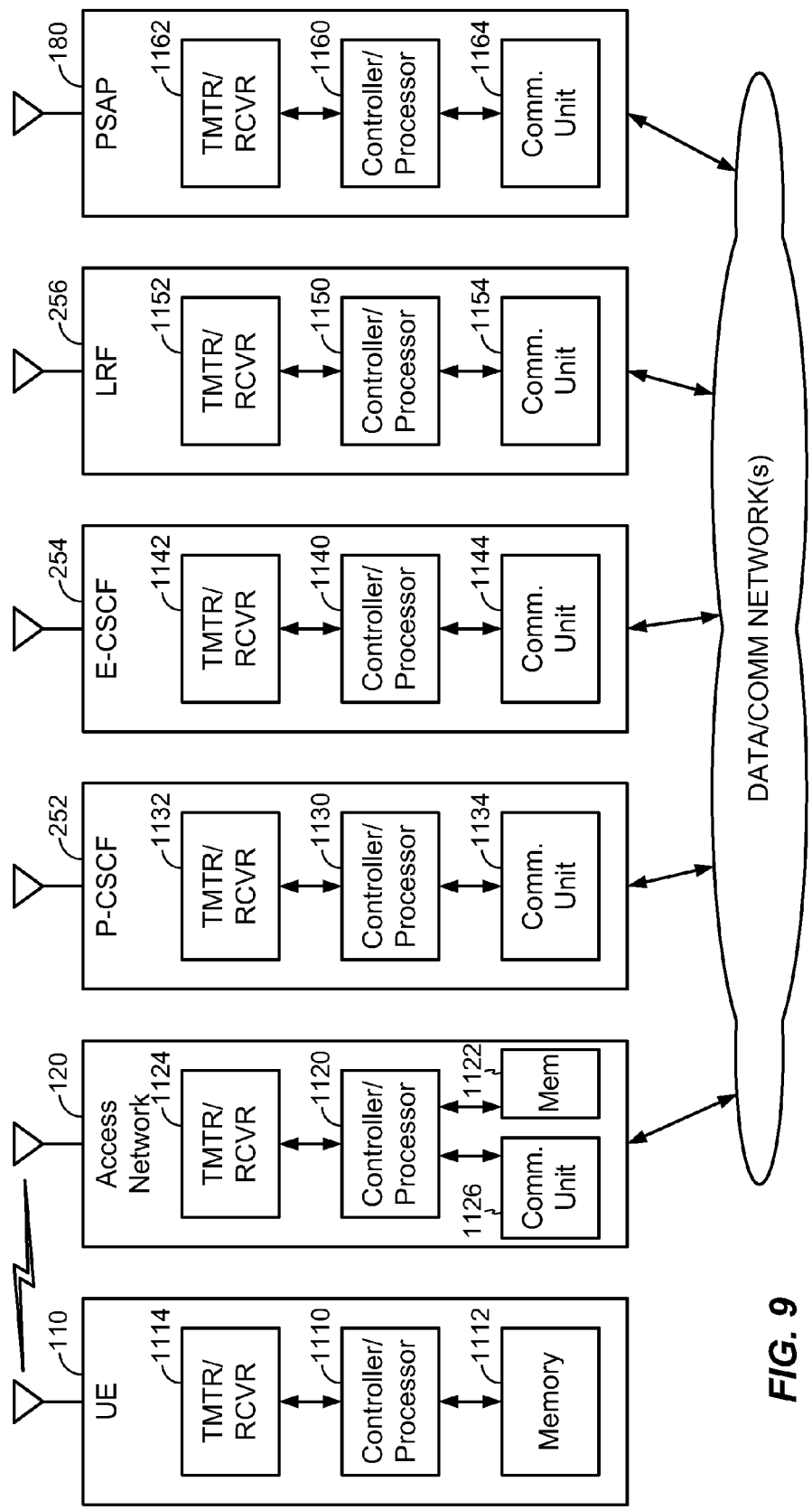
FIG. 9 is a schematic diagram of the user equipment (UE) and various network entities.

Moreover, referring to FIG. 9, one example of components of the network includes UE 110, access network 120, P-CSCF 252, E-CSCF 254, LRF 256, and PSAP 180 and their components. For simplicity, FIG. 9 includes one controller/processor and one memory for each entity. FIG. 9 also includes one transmitter/receiver (TMTR/RCVR) for UE 110, one transmitter/receiver for access network 120, and one communication (Comm) unit for each network entity. In general, each entity may include any number of controllers, processors, memories, transmitters, receivers, communication units, etc. Further, it should be noted that the functionality described herein may be implemented by the respective controller/processor of each component, such as by executing computer readable instructions. Such instructions may be stored in a respective memory, or may be implemented in one or more modules within the respective processor.

On the downlink, base stations in access network 120 transmit traffic data, messages/signaling, and pilot to UEs within their coverage area. These various types of data are processed by a processor 1120 and conditioned by a transmitter 1124 to generate downlink signals, which are transmitted to the UEs. At UE 110, the downlink signals from base stations are received via an antenna, conditioned by a receiver 1114, and processed by a processor 1110 to obtain information for registration, call establishment, etc. Processor 1110 may perform processing for UE 1100 as described above, such as with respect to FIGS. 4, 6 and 8, etc. Memories 1112 and 1122 store program codes and data for UE 110 and access network 120, respectively, for performing the functionality described herein.

On the uplink, UE 110 may transmit traffic data, messages/signaling, and pilot to base stations in access network 120. These various types of data are processed by processor 1110 and conditioned by transmitter 1114 to generate an uplink signal, which is transmitted via the UE antenna. At access network 120, the uplink signals from UE 110 and other UEs are received and conditioned by receiver 1124 and further processed by processor 1120 to obtain various types of information, e.g., data, messages/signaling, etc. Access network 120 may communicate with other network entities via communication unit 11126.

Within P-CSCF 252, a processor 1130 performs processing for the P-CSCF, a memory 1132 stores program codes and data for the P-CSCF, and a communication unit 1134 allows the P-CSCF to communicate with other entities. Processor 1130 may perform processing for P-CSCF 252 as described above, such as with respect to FIGS. 4, 6 and 8, etc.

Within E-CSCF 254, a processor 1140 performs processing for the E-CSCF, a memory 1142 stores program codes and data for the E-CSCF, and a communication unit 1144 allows the E-CSCF to communicate with other entities. Processor 1140 may perform processing for E-CSCF 254 as described above, such as with respect to FIGS. 4, 6 and 8, etc.

Within LRF 256, a processor 1150 performs location and/or positioning processing for the LRF, a memory 1152 stores program codes and data for the LRF, and a communication unit 1154 allows the LRF to communicate with other entities. Processor 1150 may perform processing for LRF 256 as described above, such as with respect to FIGS. 4, 6 and 8, etc.

Within PSAP 180, a processor 1160 performs processing for an emergency call for UE 110, a memory 1162 stores program codes and data for the PSAP, and a communication unit 1164 allows the PSAP to communicate with other entities. Processor 1160 may perform processing for PSAP 180 as described above, such as with respect to FIGS. 4, 6 and 8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with user equipment (UE) such as a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Also, the term "or" is intended to mean an inclusive "or" rather than an exclusive "or." That is, unless specified otherwise, or clear from the context, the phrase "X employs A or B" is intended to mean any of the natural inclusive permutations. For example, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method operable on a user equipment for making an emergency voice call, comprising:
   transmitting a request for an emergency call to a first serving core network via a wireless access network; and
   establishing the emergency call with a second serving core network different from the first serving core network based on:
      the first serving core network determining: an alternative serving core network, and the user equipment being located outside of a first emergency serving area of the first serving core network, and
      the first serving core network forwarding the request for the emergency call to the alternative serving core network based on a correspondence between a user equipment location and a second emergency serving area of the alternative serving core network,
   wherein the establishing at least comprises establishing the emergency call with a public safety access point having a serving geographic location that includes the user equipment location based on a location retrieval function (LRF) of the first serving core network obtaining user equipment location information corresponding to the user equipment location.

2. The method of claim 1, wherein the second serving core network is the alternative serving core network.

3. The method of claim 1, wherein the establishing is further based on the first serving core network determining that the user equipment is located inside of a second emergency serving area of the second serving core network.

4. The method of claim 1, wherein the establishing is further based on the first serving core network determining a lack of capacity to handle the emergency call.

5. The method of claim 1, further comprising:
   receiving an alternative service response from the first serving core network, wherein the alternative service response comprises an alternative core network identifier corresponding to the alternative serving core network; and
   transmitting another request for the emergency call to the alternative serving core network based on the alternative core network identifier in the alternative service response.

6. The method of claim 5, wherein receiving the alternative service response comprising the alternative core network identifier further comprises receiving at least one of a Uniform Resource Identifier (URI), a Fully Qualified Domain Name (FQDN), an IP address, or a Mobile Country Code (MCC) plus Mobile Network Code (MNC).

7. A method operable on user equipment for making an emergency voice call, comprising:
   transmitting a request for an emergency call to a first serving core network via a wireless access network;
   receiving an alternative service response from the first serving core network, wherein the alternative service response comprises an alternative core network identifier corresponding to an alternative serving core network;
   transmitting another request for the emergency call to the alternative serving core network based on the alternative core network identifier in the alternative service response; and
   establishing the emergency call with a second serving core network different from the first serving core network, wherein the establishing is based on the first serving core network determining the alternative serving core network,
   wherein receiving the alternative service response further comprises receiving based on the first serving core network determining a user equipment location from information received from an associated location retrieval function (LRF) and further determining that the user equipment location is outside of a first emergency serving area of the first serving core network.

8. The method of claim 7, wherein the establishing is based on a forwarding of the emergency call through a sequence of alternative serving core networks, wherein a last one of the sequence of alternative serving core networks is the second serving core network.

9. The method of claim 7, wherein the establishing is further based on the first serving core network determining a lack of capacity to handle the emergency call.

10. The method of claim 7, wherein establishing the emergency call with the second serving core network further comprises establishing with the alternative serving core network, wherein the alternative serving core network comprises a second emergency serving area different from a first emergency serving area corresponding to the first serving core network, and wherein the user equipment location is within the second emergency serving area.

11. The method of claim 10, wherein establishing the emergency call with the second serving core network further comprises establishing the emergency call with a public safety access point having a serving geographic location that includes the user equipment location.

12. The method of claim 7, wherein the alternative service response further comprises a plurality of alternative core network identifiers corresponding to a plurality of alternative serving core networks, wherein establishing the emergency call with the second serving core network further comprises establishing with one of the plurality of alternative serving core networks, and wherein transmitting the request for the emergency call further comprises transmitting to more than one of the plurality of alternative serving core networks based on receiving at least one additional alternative service response from at least one of the plurality of alternative serving core networks.

13. The method of claim 7, wherein establishing the emergency call with the second serving core network further comprises establishing with a last one of a series of alternative serving core networks based on receiving a series of additional alternative network responses each comprising a respective alternate network identifier for one of the series of alternative serving core networks, and further based on successively transmitting additional requests for the emergency call to each of the series of alternative serving core networks based on successively receiving a respective one of the series of additional alternative network responses.

14. The method of claim 7, further comprising:
wherein transmitting the request for the emergency call to the first serving core network further comprises sending a REGISTER message or an INVITE message, with an emergency indication, to a first Proxy Call Session Control Function (P-CSCF) of a first Internet Protocol Media Subsystem (IMS) core;
wherein receiving the alternative service response further comprises receiving a 380 Alternative Service response message or a 305 response message or a 3xx response message, wherein the alternative service identifier comprises at least one of a Uniform Resource Identifier (URI) of a second Proxy Call Session Control Function (P-CSCF) of the alternative serving core network, a Fully Qualified Domain Name (FQDN) of the second P-CSCF, an IP address of the second P-CSCF, or a Mobile Country Code (MCC) plus Mobile Network Code (MNC) of the second P-CSCF;
wherein transmitting another request for the emergency call to the alternative serving core network further comprises sending a second REGISTER message with the emergency indication to the alternative serving core network;
transmitting an INVITE message with an emergency indication to the alternative serving core network; and
wherein establishing the emergency call further comprises establishing with a public safety access point via the alternative serving core network, wherein the public safety access point comprises a serving geographic location that includes the user equipment location.

15. The method of claim 14, wherein receiving the 380 Alternative Service response message or the 305 response message or the 3xx response message further comprises receiving the alternative service identifier in a Session Initiation Protocol (SIP) Contact Address header.

16. The method of claim 7, wherein establishing the emergency call with the second serving core network is further based on the first serving core network forwarding the request for the emergency call to the alternative serving core network based on a correspondence between a user equipment location and a second emergency serving area of the alternative serving core network.

17. The method of claim 16, wherein the alternative serving core network is the second serving core network.

18. The method of claim 16, wherein the establishing is further based on a forwarding of the emergency call through a sequence of alternative serving core networks, wherein a first forwarding occurs from the first serving core network to a first alternative serving core network in the sequence and a last forwarding occurs from a last alternative serving core network in the sequence to the second serving core network, and wherein other instances of forwarding occur between intermediate alternative serving core networks in the sequence.

19. The method of claim 16, wherein establishing the emergency call with the second serving core network further comprises establishing the emergency call with a public safety access point having a serving geographic location that includes the user equipment location.

20. The method of claim 19, wherein establishing the emergency call with the public safety access point having the serving geographic location that includes the user equipment location is further based on the LRF of the first serving core network obtaining user equipment location information corresponding to the user equipment location.

21. A method operable on user equipment for making an emergency voice call, comprising:
transmitting a request for an emergency call to a first serving core network via a wireless access network;
establishing the emergency call with a second serving core network different from the first serving core network, wherein the establishing is based on the first serving core network determining an alternative serving core network;
wherein establishing the emergency call with the second serving core network is further based on the first serving core network forwarding the request for the emergency call to the alternative serving core network based on a correspondence between a user equipment location and a second emergency serving area of the alternative serving core network;
wherein the alternative serving core network is the second serving core network;
wherein transmitting the request for the emergency call to the first serving core network further comprises sending an INVITE message, with an emergency indication, to a first Proxy Call Session Control Function (P-CSCF) of a first Internet Protocol Media Subsystem (IMS) core; and
wherein establishing the emergency call with the second serving core network is further based on the first serving core network forwarding the INVITE message to a second Proxy Call Session Control Function (P-CSCF) of a second Internet Protocol Media Subsystem (IMS) core.

22. The method of claim 21, wherein establishing the emergency call with the second serving core network based on the first serving core network forwarding the INVITE message to the second Proxy Call Session Control Function (P-CSCF) of the second Internet Protocol Media Subsystem (IMS) core is further based on forwarding via an Emergency Call Session Control Function (E-CSCF) of the first Internet Protocol Media Subsystem (IMS) core, and further based on the E-CSCF determining the user equipment location from an associated location retrieval function (LRF).

23. The method of claim 21, wherein the establishing is further based on the first serving core network determining a location of the user equipment based on a location retrieval function (LRF) of the first serving core network obtaining user equipment location information corresponding to the location of the user equipment from a location server of an Internet Protocol Connectivity Access Network (IP-CAN) used by the user equipment.

24. The method of claim 21, wherein the establishing is further based on the first serving core network determining a location of the user equipment based on a location retrieval function (LRF) of the serving core network obtaining user equipment location information corresponding to the location of the user equipment from the user equipment.

25. At least one processor operable on a user equipment and configured to make an emergency voice call, comprising:
 a first module for transmitting a request for an emergency call to a first serving core network via a wireless access network; and
 a second module for establishing the emergency call with a second serving core network different from the first serving core network based on:
  the first serving core network determining: an alternative serving core network, and the user equipment being located outside of a first emergency serving area of the first serving core network, and
  the first serving core network forwarding the request for the emergency call to the alternative serving core network based on a correspondence between a user equipment location and a second emergency serving area of the alternative serving core network,
 wherein the establishing at least comprises establishing the emergency call with a public safety access point having a serving geographic location that includes the user equipment location based on a location retrieval function (LRF) of the first serving core network obtaining user equipment location information corresponding to the user equipment location.

26. A computer program product stored in memory, operable on a user equipment and configured to make an emergency voice call, comprising:
 a non-transitory computer-readable medium comprising:
  a first set of codes for causing a computer to transmit a request for an emergency call to a first serving core network via a wireless access network; and
  a second set of codes for causing the computer to establish the emergency call with a second serving core network different from the first serving core network based on:
   the first serving core network determining: an alternative serving core network, and the user equipment being located outside of a first emergency serving area of the first serving core network, and
   the first serving core network forwarding the request for the emergency call to the alternative serving core network based on a correspondence between a user equipment location and a second emergency serving area of the alternative serving core network,
  wherein establish the emergency call at least comprises establishing the emergency call with a public safety access point having a serving geographic location that includes the user equipment location based on a location retrieval function (LRF) of the first serving core network obtaining user equipment location information corresponding to the user equipment location.

27. An apparatus for making an emergency voice call, comprising:
 means for transmitting a request for an emergency call to a first serving core network via a wireless access network; and
 means for establishing the emergency call with a second serving core network different from the first serving core network based on:
  the first serving core network determining: an alternative serving core network, and the user equipment being located outside of a first emergency serving area of the first serving core network, and
  the first serving core network forwarding the request for the emergency call to the alternative serving core network based on a correspondence between a user equipment location and a second emergency serving area of the alternative serving core network,
 wherein the means for establishing at least comprises means for establishing the emergency call with a public safety access point having a serving geographic location that includes the user equipment location based on a location retrieval function (LRF) of the first serving core network obtaining user equipment location information corresponding to the user equipment location.

28. An apparatus for a user equipment (UE) for making an emergency voice call, comprising:
 at least one processor configured to transmit a request for an emergency call to a first serving core network via a wireless access network, and to establish the emergency call with a second serving core network different from the first serving core network based on:
  the first serving core network determining: an alternative serving core network, and the user equipment being located outside of a first emergency serving area of the first serving core network, and
  the first serving core network forwarding the request for the emergency call to the alternative serving core network based on a correspondence between a user equipment location and a second emergency serving area of the alternative serving core network,
 wherein establish the emergency call at least comprises establishing the emergency call with a public safety access point having a serving geographic location that includes the user equipment location based on a location retrieval function (LRF) of the first serving core network obtaining user equipment location information corresponding to the user equipment location.

29. The apparatus of claim 28, wherein the second serving core network is the same as the alternative serving core network.

30. The apparatus of claim 28, wherein the at least one processor is, configured to establish the emergency call with the second serving core network further based on a forwarding of the emergency call through a sequence of alternative serving core networks, wherein a last one of the sequence of alternative serving core networks is the second serving core network.

31. The apparatus of claim 28, wherein the at least one processor is configured to establish the emergency call with the second serving core network further based on the first serving core network determining that the user equipment is located inside of a second emergency serving area of the second serving core network.

32. The apparatus of claim 28, wherein the at least one processor is configured to establish the emergency call with the second serving core network further based on the first serving core network determining a lack of capacity to handle the emergency call.

33. The apparatus of claim 28, wherein the at least one processor is further configured to:
receive an alternative service response from the first serving core network, wherein the alternative service response comprises an alternative core network identifier corresponding to the alternative serving core network; and
transmit another request for the emergency call to the alternative serving core network based on the alternative core network identifier in the alternative service response.

34. The apparatus of claim 33, wherein the alternative core network identifier further comprises at least one of a Uniform Resource Identifier (URI), a Fully Qualified Domain Name (FQDN), an IP address, or a Mobile Country Code (MCC) plus Mobile Network Code (MNC).

35. An apparatus for a user equipment (UE) for making an emergency voice call, comprising:
at least one processor configured to:
transmit a request for an emergency call to a first serving core network via a wireless access network,
establish the emergency call with a second serving core network different from the first serving core network, wherein the establishing is based on the first serving core network determining an alternative serving core network,
receive an alternative service response from the first serving core network, wherein the alternative service response comprises an alternative core network identifier corresponding to the alternative serving core network,
transmit another request for the emergency call to the alternative serving core network based on the alternative core network identifier in the alternative service response, and
receive the alternative service response based on the first serving core network determining: a user equipment location from information received from an associated location retrieval function (LRF), and the user equipment location being outside of a first emergency serving area of the first serving core network.

36. The apparatus of claim 35, wherein the at least one processor is configured to establish the emergency call with the second serving core network further based on the first serving core network determining a lack of capability to handle the emergency call.

37. The apparatus of claim 35, wherein the second serving core network further comprises the alternative serving core network, wherein the alternative serving core network comprises a second emergency serving area different from a first emergency serving area corresponding to the first serving core network, and wherein the user equipment location is within the second emergency serving area.

38. The apparatus of claim 37, wherein the at least one processor is further configured to establish the emergency call with a public safety access point having a serving geographic location that includes the user equipment location.

39. The apparatus of claim 35, wherein the alternative service response further comprises a plurality of alternative serving core network identifiers corresponding to a plurality of alternative serving core networks, wherein the second serving core network further comprises one of the plurality of alternative serving core networks, and wherein the at least one processor is further configured to transmit the request for the emergency call to more than one of the plurality of plurality of alternative serving core networks based on receiving at least one additional alternative service response from at least one of the plurality of alternative serving core networks.

40. The apparatus of claim 35, wherein the second serving core network further comprises a last one of a series of alternative serving core networks, wherein the at least one processor is further configured to establish the emergency call with the last one of a series of alternative serving core networks based on receiving a series of additional alternative network responses each comprising a respective alternate network identifier for one of the series of alternative serving core networks, and further based on successively transmitting additional requests for the emergency call to each of the series of alternative serving core networks based on successively receiving a respective one of the series of additional alternative network responses.

41. The apparatus of claim 35, wherein the at least one processor is further configured to:
transmit the request for the emergency call to the first serving core network by sending a REGISTER message or an INVITE message, with an emergency indication, to a first Proxy Call Session Control Function (P-CSCF) of a first Internet Protocol Media Subsystem (IMS) core;
receive the alternative service response by receiving a 380 Alternative Service response message or a 305 response message or a 3xx response message, wherein the alternative service identifier comprises at least one of a Uniform Resource Identifier (URI) of a second Proxy Call Session Control Function (P-CSCF) of the alternative serving core network, a Fully Qualified Domain Name (FQDN) of the second P-CSCF, an IP address of the second P-CSCF, or a Mobile Country Code (MCC) plus Mobile Network Code (MNC) of the second P-CSCF;
transmit another request for the emergency call to the alternative serving core network by sending a second REGISTER message with the emergency indication to the alternative serving core network;
transmit an INVITE message with an emergency indication to the alternative serving core network; and
establish the emergency call by establishing the emergency call with a public safety access point via the alternative serving core network, wherein the public safety access point comprises a serving geographic location that includes the user equipment location.

42. The apparatus of claim 41, wherein the 380 Alternative Service response message or the 305 response message or the 3xx response message further comprises the alternative service identifier in a Session Initiation Protocol (SIP) Contact Address header.

43. The apparatus of claim 35, wherein the at least one processor is further configured to establish the emergency call with the second serving core network based on the first serving core network forwarding the request for the emergency call to the second serving core network based on a correspondence between a user equipment location and a second emergency serving area of the second serving core network.

44. The apparatus of claim 43, wherein the alternative serving core network is the second serving core network.

45. The apparatus of claim 43, wherein the at least one processor is configured to establish the emergency call further based on a forwarding of the emergency call through a sequence of alternative serving core networks, wherein a first forwarding occurs from the first serving core network to a first alternative serving core network in the sequence and a last forwarding occurs from a last alternative serving core network in the sequence to the second serving core network, and wherein other instances of forwarding occur between intermediate alternative serving core networks in the sequence.

46. The apparatus of claim 43, wherein the at least one processor is further configured to establish the emergency call with a public safety access point having a serving geographic location that includes the user equipment location.

47. The apparatus of claim 46, wherein the at least one processor is further configured to establish the emergency call with the public safety access point having the serving geographic location that includes the user equipment location further based on the LRF of the second serving core network obtaining user equipment location information corresponding to the user equipment location.

48. An apparatus for a user equipment (UE) for making an emergency voice call, comprising:
at least one processor configured to:
transmit a request for an emergency call to a first serving core network via a wireless access network, the request comprising an INVITE message, with an emergency indication, being transmitted to a first Proxy Call Session Control Function (P-CSCF) of a first Internet Protocol Media Subsystem (IMS) core; and
establish the emergency call with a second serving core network different from the first serving core network, wherein the establishing is based on the first serving core network determining an alternative serving core network, and based on the first serving core network forwarding the request for the emergency call to the second serving core network based on a correspondence between a user equipment location and a second emergency serving area of the second serving core network, and further based on the first serving core network forwarding the INVITE message to a second Proxy Call Session Control Function (P-CSCF) of a second Internet Protocol Media Subsystem (IMS) core;
wherein the alternative serving core network is the second serving core network.

49. The apparatus of claim 48, wherein the at least one processor is further configured to establish the emergency call with the second serving core network based on the first serving core network forwarding the INVITE message to the second Proxy Call Session Control Function (P-CSCF) of the second Internet Protocol Media Subsystem (IMS) core via an Emergency Call Session Control Function (E-CSCF) of the first Internet Protocol Media Subsystem (IMS) core, and further based on the E-CSCF determining the user equipment location from an associated location retrieval function (LRF).

50. The apparatus of claim 48, wherein the at least one processor is further configured to establish the emergency call based on the first serving core network determining a user equipment location based on a location retrieval function (LRF) of the first serving core network obtaining user equipment location information corresponding to the user equipment location from a location server of an Internet Protocol Connectivity Access Network (IP-CAN) used by the user equipment.

51. The apparatus of claim 48, wherein the at least one processor is further configured to establish the emergency call based on the first serving core network determining a user equipment location based on a location retrieval function (LRF) of the first serving core network obtaining user equipment location information corresponding to the user equipment location from the user equipment.

52. A method operable on a network entity for establishing an emergency voice call, comprising:
receiving, at a first serving core network, a request for an emergency call from a user equipment via a wireless access network;
determining, by the first serving core network, an alternate serving core network, the user equipment being located outside of a first emergency service area of the first serving core network, and the first serving core network forwarding the request for the emergency call to the alternative serving core network based on a correspondence between a user equipment location and a second emergency serving area of the alternative serving core network; and
initiating, by the first serving core network and based on the determining, an establishment of the emergency call with a second serving core network different from the serving core network at least comprising establishing the emergency call with a public safety access point having a serving geographic location that includes the user equipment location based on a location retrieval function (LRF) of the first serving core network obtaining user equipment location information corresponding to the user equipment location.

53. The method of claim 52, wherein the second serving core network is the alternative serving core network.

54. The method of claim 52, wherein the initiating is based on a forwarding of the emergency call through a sequence of alternative serving core networks, wherein a last one of the sequence of alternative serving core networks is the second serving core network.

55. The method of claim 52, wherein the determining comprises determining that the user equipment is located inside of a second emergency serving area of the second serving core network.

56. The method of claim 52, wherein the determining comprises determining a lack of capacity to handle the emergency call.

57. The method of claim 52, wherein the initiating further comprises transmitting an alternative service response to the user equipment, wherein the alternative service response comprises an alternative core network identifier corresponding to an alternative serving core network, wherein the alternative service response is operable to initiate the user equipment to transmit another request for the emergency call to the alternative serving core network based on the alternative core network identifier in the alternative service response.

58. The method of claim 57, wherein transmitting the alternative service response comprising the alternative core network identifier further comprises transmitting at least one of a Uniform Resource Identifier (URI), a Fully Qualified Domain Name (FQDN), an IP address, or a Mobile Country Code (MCC) plus Mobile Network Code (MNC).

59. The method of claim 57, wherein transmitting the alternative service response further comprises transmitting a plurality of alternative core network identifiers corresponding to a plurality of alternative serving core networks.

60. A method operable on a network entity for establishing an emergency voice call, comprising:
receiving, at a first serving core network, a request for an emergency call from a user equipment via a wireless access network;
determining, by the first serving core network, an alternate serving core network; and
initiating, by the first serving core network and based on the determining, an establishment of the emergency call with a second serving core network different from the serving core network, comprising transmitting an alternative service response to the user equipment,
wherein the alternative service response comprises an alternative core network identifier corresponding to an alternative serving core network, and the alternative service response is operable to initiate the user equipment to transmit another request for the emergency call to the alternative serving core network based on the alternative core network identifier in the alternative service response, and wherein the initiating is further based on receiving a user equipment location from an associated location retrieval function (LRF) and further determining that the user equipment is located outside of a first emergency serving area of the first serving core network.

61. The method of claim 60, wherein the determining comprises determining a lack of capability to handle the emergency call.

62. The method of claim 60, wherein determining further comprises determining that the alternative serving core network comprises a second emergency serving area different from the first emergency serving area, and determining that the user equipment location is within the second emergency serving area.

63. The method of claim 62, wherein the determining further comprises identifying a public safety access point having a serving geographic location that includes the user equipment location.

64. The method of claim 60, further comprising:

wherein receiving the request for the emergency call further comprises receiving a REGISTER message or an INVITE message, with an emergency indication, at a first Proxy Call Session Control Function (P-CSCF) of a first Internet Protocol Media Subsystem (IMS) core;

wherein transmitting the alternative service response further comprises transmitting a 380 Alternative Service response message or a 305 response message or a 3xx response message, wherein the alternative service identifier comprises at least one of a Uniform Resource Identifier (URI) of a second Proxy Call Session Control Function (P-CSCF) of the alternative serving core network, a Fully Qualified Domain Name (FQDN) of the second P-CSCF, an IP address of the second P-CSCF, or a Mobile Country Code (MCC) plus Mobile Network Code (MNC) of the second P-CSCF; and wherein initiating establishment of the emergency call further comprises initiating establishment with a public safety access point of the alternative serving core network, wherein the public safety access point comprises a serving geographic location that includes the user equipment location.

65. The method of claim 64, wherein transmitting the 380 Alternative Service response message or the 305 response message or the 3xx response message further comprises transmitting the alternative service identifier in a Session Initiation Protocol (SIP) Contact Address header.

66. The method of claim 60, wherein the initiating further comprises forwarding the request for the emergency call to the second serving core network based on a correspondence between a user equipment location and a second emergency serving area of the second serving core network.

67. The method of claim 66, wherein the alternative serving core network is the second serving core network.

68. The method of claim 66, wherein the initiating further comprises forwarding the emergency call through a sequence of alternative serving core networks, wherein a first forwarding occurs from the first serving core network to a first alternative serving core network in the sequence and a last forwarding occurs from a last alternative serving core network in the sequence to the second serving core network, and wherein other instances of forwarding occur between intermediate alternative serving core networks in the sequence.

69. The method of claim 66, wherein the initiating further comprises initiating with a public safety access point having a serving geographic location that includes the user equipment location.

70. A method operable on a network entity for establishing an emergency voice call, comprising:

receiving, at a first serving core network, a request for an emergency call from a user equipment via a wireless access network, and an INVITE message, with an emergency indication, at a first Proxy Call Session Control Function (P-CSCF) of a first Internet Protocol Media Subsystem (IMS) core;

determining, by the first serving core network, an alternate serving core network; and initiating, by the first serving core network and based on the determining, an establishment of the emergency call with a second serving core network different from the serving core network, comprising:

forwarding the request for the emergency call to the second serving core network based on a correspondence between a user equipment location and a second emergency serving area of the second serving core network; and forwarding the INVITE message to a second Emergency Call Session Control Function (E-CSCF) of a second Internet Protocol Media Subsystem (IMS) core, wherein the alternative serving core network is the second serving core network.

71. The method of claim 70, wherein the initiating is further based on obtaining user equipment location information corresponding to the user equipment location from an associated location retrieval function (LRF).

72. The method of claim 70, further comprising forwarding the INVITE message from the second E-CSCF to an emergency center based on the second E-CSCF determining the user equipment location from an associated location retrieval function (LRF).

73. A method operable on a network entity for establishing an emergency voice call, comprising:

receiving, at a first serving core network, a request for an emergency call from a user equipment via a wireless access network, and an INVITE message, with an emergency indication, at a first Proxy Call Session Control Function (P-CSCF) of a first Internet Protocol Media Subsystem (IMS) core;

determining, by the first serving core network, an alternate serving core network; and initiating, by the first serving core network and based on the determining, an establishment of the emergency call with a second serving core network different from the serving core network, comprising:

forwarding the request for the emergency call to the second serving core network based on a correspondence between a user equipment location and a second emergency serving area of the second serving core network; and forwarding the INVITE message to a first Emergency Call Session Control Function (E-CSCF) of a first Internet Protocol Media Subsystem (IMS) core, and further forwarding the INVITE message from the first E-CSCF to a second E-CSCF of a second IMS core, wherein the alternative serving core network is the second serving core network.

74. The method of claim 73, further comprising forwarding the INVITE message from the second E-CSCF to an emergency center based on the second E-CSCF determining the user equipment location from an associated location retrieval function (LRF).

75. A method operable on a network entity for establishing an emergency voice call, comprising:
receiving, at a first serving core network, a request for an emergency call from a user equipment via a wireless access network, and an INVITE message, with an emergency indication, at a first Proxy Call Session Control Function (P-CSCF) of a first Internet Protocol Media Subsystem (IMS) core;
determining, by the first serving core network, an alternate serving core network; and
initiating, by the first serving core network and based on the determining, an establishment of the emergency call with a second serving core network different from the serving core network, comprising forwarding the request for the emergency call to the second serving core network based on a correspondence between a user equipment location and a second emergency serving area of the second serving core network, and based on forwarding the INVITE message to a second P-CSCF of a second IMS core, and further forwarding the INVITE message from the second P-CSCF to a second Emergency Call Session Control Function (E-CSCF) of the second IMS core;
wherein the alternative serving core network is the second serving core network.

76. The method of claim 75, further comprising forwarding the INVITE message from the second E-CSCF to an emergency center based on the second E-CSCF determining the user equipment location from an associated location retrieval function (LRF).

77. The method of claim 75, further comprising determining a user equipment location by obtaining user equipment location information corresponding to the user equipment location from a location retrieval function (LRF) of the first serving core network, wherein the LRF obtains the user equipment location information from an Internet Protocol Connectivity Access Network (IP-CAN) used by the user equipment.

78. The method of claim 75, further comprising determining a user equipment location by obtaining user equipment location information corresponding to the user equipment location from a location retrieval function (LRF) of the serving core network, wherein the LRF obtains the user equipment location information from the user equipment.

79. An apparatus for a network entity for establishing an emergency voice call, comprising:
at least one processor configured to:
receive, at a first serving core network, a request for an emergency call from a user equipment via a wireless access network,
determine, by the first serving core network, an alternative serving core network, the user equipment being located outside of a first emergency service area of the first serving core network, and the first serving core network forwarding the request for the emergency call to the alternative serving core network based on a correspondence between a user equipment location and a second emergency serving area of the alternative serving core network; and
initiate an establishment of the emergency call with a second serving core network different from the first serving core network at least based on the determined alternative serving core network and the user equipment being located outside of a first emergency serving area of the first serving core network at least comprising establishing the emergency call with a public safety access point having a serving geographic location that includes the user equipment location based on a location retrieval function (LRF) of the first serving core network obtaining user equipment location information corresponding to the user equipment location.

80. The apparatus of claim 79, wherein the second serving core network is the alternative serving core network.

81. The apparatus of claim 79, wherein the at least one processor is configured to initiate by forwarding the emergency call through a sequence of alternative serving core networks, wherein a last one of the sequence of alternative serving core networks is the second serving core network.

82. The apparatus of claim 79, wherein the at least one processor is configured to determine and to initiate based on determining that the user equipment is located inside of a second emergency serving area of the second serving core network.

83. The apparatus of claim 79, wherein the at least one processor is configured to determine and to initiate based on determining a lack of capacity to handle the emergency call.

84. The apparatus of claim 79, wherein the at least one processor is further configured to initiate by transmitting an alternative service response to the user equipment, wherein the alternative service response comprises an alternative core network identifier corresponding to an alternative serving core network, wherein the alternative service response is operable to initiate the user equipment to transmit another request for the emergency call to the alternative serving core network based on the alternative core network identifier in the alternative service response.

85. The apparatus of claim 84, wherein the alternative core network identifier further comprises at least one of a Uniform Resource Identifier (URI), a Fully Qualified Domain Name (FQDN), an IP address, or a Mobile Country Code (MCC) plus Mobile Network Code (MNC).

86. The apparatus of claim 84, wherein the alternative service response further comprises a plurality of alternative core network identifiers corresponding to a plurality of alternative serving core networks.

87. The apparatus of claim 79, wherein the at least one processor is configured to:
receive the request comprising an INVITE message, with an emergency indication, at a first Proxy Call Session Control Function (P-CSCF) of a first Internet Protocol Media Subsystem (IMS) core; and
initiate by forwarding the INVITE message to a first Emergency Call Session Control Function (E-CSCF) of a first Internet Protocol Media Subsystem (IMS) core, and forwarding the INVITE message from the first E-CSCF to a second E-CSCF of a second IMS core.

88. The apparatus of claim 87, wherein the at least one processor is configured to further initiate by forwarding the INVITE message from the second E-CSCF to an emergency center based on the second E-CSCF determining the user equipment location from the LRF.

89. An apparatus for a network entity for establishing an emergency voice call, comprising:
at least one processor configured to:
receive, at a first serving core network, a request for an emergency call from a user equipment via a wireless access network,
determine an alternative serving core network, and
initiate, based on the determining, an establishment of the emergency call with a second serving core network different from the first serving core network by transmitting an alternative service response to the user equipment, wherein the alternative service response comprises an alternative core network identifier corresponding to an alternative serving core network, and the alternative service response is operable to initiate the user equipment to transmit another request for the emergency call to the alternative serving core network based on the alternative core network identifier in the alternative service response, and wherein the user equipment location is received from an associated location retrieval function (LRF) and wherein the at least one processor is further configured to initiate by determining that the user equipment is located outside of a first emergency serving area of the first serving core network.

90. The apparatus of claim 89, wherein the at least one processor is configured to determine and to initiate based on determining a lack of capability to handle the emergency call.

91. The apparatus of claim 89, wherein the at least one processor is further configured to transmit the alternative service response based on determining that the alternative serving core network comprises a second emergency serving area different from the first emergency serving area, and further based on determining that a user equipment location is within the second emergency serving area.

92. The apparatus of claim 91, wherein the at least one processor is further configured to initiate based on identifying a public safety access point having a serving geographic location that includes the user equipment location.

93. The apparatus of claim 89, further comprising:
wherein the request for the emergency call further comprises a REGISTER message or an INVITE message, with an emergency indication, received at a first Proxy Call Session Control Function (P-CSCF) of a first Internet Protocol Media Subsystem (IMS) core;
wherein the alternative service response further comprises a 380 Alternative Service response message or a 305 response message or a 3xx response message, wherein the alternative service identifier comprises at least one of a Uniform Resource Identifier (URI) of a second Proxy Call Session Control Function (P-CSCF) of the alternative serving core network, a Fully Qualified Domain Name (FQDN) of the second P-CSCF, an IP address of the second P-CSCF, or a Mobile Country Code (MCC) plus Mobile Network Code (MNC) of the second P-CSCF; and
wherein the at least one processor is further configured to initiate establishment of the emergency call with a public safety access point of the alternative serving core network, wherein the public safety access point comprises a serving geographic location that includes the user equipment location.

94. The apparatus of claim 93, wherein the 380 Alternative Service response message or the 305 response message or the 3xx response message further comprises the alternative service identifier in a Session Initiation Protocol (SIP) Contact Address header.

95. The apparatus of claim 89, wherein the at least one processor is further configured to initiate by forwarding the request for the emergency call to the alternative serving core network based on a correspondence between a user equipment location and a second emergency serving area of the second serving core network.

96. The apparatus of claim 95, wherein the alternative serving core network is the second serving core network.

97. The apparatus of claim 96, wherein the at least one processor is configured to:
receive the request comprising an INVITE message, with an emergency indication, at a first Proxy Call Session Control Function (P-CSCF) of a first Internet Protocol Media Subsystem (IMS) core; and
initiate by forwarding the INVITE message to a second Emergency Call Session Control Function (E-CSCF) of a second Internet Protocol Media Subsystem (IMS) core.

98. The apparatus of claim 97, wherein the at least one processor is configured to further initiate by forwarding the INVITE message from the second E-CSCF to an emergency center based on the second E-CSCF determining the user equipment location from the LRF.

99. The apparatus of claim 95, the at least one processor is further configured to initiate by forwarding the emergency call through a sequence of alternative serving core networks, wherein a first forwarding occurs from the first serving core network to a first alternative serving core network in the sequence and a last forwarding occurs from a last alternative serving core network in the sequence to the second serving core network, and wherein other instances of forwarding occur between intermediate alternative serving core networks in the sequence.

100. The apparatus of claim 95, wherein the second serving core network further comprises a public safety access point having a serving geographic location that includes the user equipment location.

101. An apparatus for a network entity for establishing an emergency voice call, comprising:
at least one processor configured to:
receive, at a first serving core network, a request for an emergency call from a user equipment via a wireless access network, the request comprising an INVITE message, with an emergency indication, received at a first Proxy Call Session Control Function (P-CSCF) of a first Internet Protocol Media Subsystem (IMS) core;
determine an alternative serving core network;
initiate, based on the determining, an establishment of the emergency call with a second serving core network different from the first serving core network by forwarding the request for the emergency call to the alternative serving core network based on a correspondence between a user equipment location and a second emergency serving area of the second serving core network; and
forward the INVITE message to a second P-CSCF of a second IMS core, and further forwarding the INVITE message from the second P-CSCF to a second Emergency Call Session Control Function (E-CSCF) of the second IMS core;
wherein the alternative serving core network is the second serving core network.

102. The apparatus of claim 101, wherein the at least one processor is further configured to forward the INVITE message from the second E-CSCF to an emergency center based on the second E-CSCF determining the user equipment location from an associated location retrieval function (LRF).

103. The apparatus of claim 101, wherein the at least one processor is further configured to determine a user equipment location by obtaining user equipment location information corresponding to the user equipment location from a location retrieval function (LRF) of the first serving core network, wherein the LRF obtains the user equipment location information from an Internet Protocol Connectivity Access Network (IP-CAN) used by the user equipment.

104. The apparatus of claim 101, wherein the at least one processor is further configured to determine a user equipment location by obtaining user equipment location information corresponding to the user equipment location from a location retrieval function (LRF) of the first serving core network, wherein the LRF obtains the user equipment location information from the user equipment.

105. At least one processor operable on a network entity and configured to establish an emergency voice call, comprising:
- a first module for receiving, at a first serving core network, a request for an emergency call from a user equipment via a wireless access network;
- a second module for determining, at the first serving core network, an alternative serving core network, and the first serving core network forwarding the request for the emergency call to the alternative serving core network based on a correspondence between a user equipment location and a second emergency serving area of the alternative serving core network; and
- a third module for initiating, at the first serving core network, an establishment of the emergency call with a second serving core network different from the first serving core network based on the determined alternative serving core network and based on determining that the user equipment is located outside of a first emergency serving area of the first serving core network, the initiating at least comprising establishing the emergency call with a public safety access point having a serving geographic location that includes the user equipment location based on a location retrieval function (LRF) of the first serving core network obtaining user equipment location information corresponding to the user equipment location.

106. The at least one processor of claim 105, wherein the third module is further configured to obtain user equipment location information corresponding to the user equipment location from an associated location retrieval function (LRF).

107. A computer program product stored in memory, operable on a network entity and configured to establish an emergency voice call, comprising:
a non-transitory computer-readable medium comprising:
- a first set of codes operable to cause a computer to receive, at a first serving core network, a request for an emergency call from a user equipment via a wireless access network;
- a second set of codes operable to cause the computer to determine, at the first serving core network, an alternative serving core network, and the first serving core network forwarding the request for the emergency call to the alternative serving core network based on a correspondence between a user equipment location and a second emergency serving area of the alternative serving core network; and
- a third set of codes operable to cause the computer to initiate, at the first serving core network, an establishment of the emergency call with a second serving core network different from the first serving core network based on the determined alternative core network and based on determining that the user equipment is located outside of a first emergency serving area of the first serving core network at least comprising establishing the emergency call with a public safety access point having a serving geographic location that includes the user equipment location based on a location retrieval function (LRF) of the first serving core network obtaining user equipment location information corresponding to the user equipment location.

108. An apparatus for establishing an emergency voice call, comprising:
- means for receiving, at a first serving core network, a request for an emergency call from a user equipment via a wireless access network;
- means for determining, at the first serving core network, an alternative serving core network, and the first serving core network forwarding the request for the emergency call to the alternative serving core network based on a correspondence between a user equipment location and a second emergency serving area of the alternative serving core network; and
- means for initiating, at the first serving core network, an establishment of the emergency call with a second serving core network different from the serving core network based on the determined alternative serving core network and based on determining that the user equipment is located outside of a first emergency serving area of the first serving core network, the means for initiating at least comprising means for establishing the emergency call with a public safety access point having a serving geographic location that includes the user equipment location based on a location retrieval function (LRF) of the first serving core network obtaining user equipment location information corresponding to the user equipment location.

* * * * *